United States Patent
Odabashyan et al.

(10) Patent No.: US 10,453,141 B2
(45) Date of Patent: Oct. 22, 2019

(54) COMPOSITE PORTFOLIO TRADING METHOD, CREATION AND ANALYSIS SYSTEM

(71) Applicants: Gevork Levon Odabashyan, Moscow (RU); Artavazd Gevork Kardashyan, Anchorage, AK (US)

(72) Inventors: Gevork Levon Odabashyan, Moscow (RU); Artavazd Gevork Kardashyan, Anchorage, AK (US)

(*) Notice: Subject to any disclaimer, the term of this patent is extended or adjusted under 35 U.S.C. 154(b) by 786 days.

(21) Appl. No.: 14/038,944

(22) Filed: Sep. 27, 2013

(65) Prior Publication Data
US 2015/0095258 A1 Apr. 2, 2015

(51) Int. Cl.
*G06Q 40/00* (2012.01)
*G06Q 40/06* (2012.01)

(52) U.S. Cl.
CPC .................... *G06Q 40/06* (2013.01)

(58) Field of Classification Search
CPC ..................................................... G06Q 40/06
USPC ...................................................... 705/35–45
See application file for complete search history.

(56) References Cited

U.S. PATENT DOCUMENTS

| | | | |
|---|---|---|---|
| 7,873,565 B2 | 1/2011 | Claus et al. | 705/37 |
| 7,970,689 B2 | 6/2011 | Glodjo | 705/37 |
| 8,036,966 B2 | 10/2011 | Brittan et al. | 705/35 |
| 2004/0143536 A1 | 7/2004 | Haberle | 705/37 |
| 2004/0199442 A1 | 10/2004 | Haberle | 705/35 |
| 2005/0171894 A1 | 8/2005 | Traynor | 705/37 |
| 2006/0173771 A1 | 8/2006 | Johnston | 705/37 |
| 2007/0043648 A1 | 2/2007 | Chait | 705/37 |
| 2009/0210336 A1 | 8/2009 | Sankowski, II | 705/37 |
| 2009/0254471 A1 | 10/2009 | Seidel | 705/37 |
| 2010/0036775 A1 | 2/2010 | Edens | 705/36 R |
| 2010/0042553 A1 | 2/2010 | Van Erlach | 705/36 R |

*Primary Examiner* — Chia-Yi Liu
(74) *Attorney, Agent, or Firm* — Ostrolenk Faber LLP

(57) ABSTRACT

A trader is enabled to create, to visualize, to study historical performance, to track, to perform analysis on, to share, to edit and to trade a personal composite instrument (PCI) that includes a first portfolio with a first set or group of assets and their respective quantities, and a second portfolio with a second set of assets and their respective quantities, the first portfolio "traded against" the second portfolio, leading to the creation of a new independent financial entity. Being a flexible and universal tool for traders in financial markets, the PCI provides an opportunity to invent unique financial entities which can open hidden ground for performing an in-depth analysis of assets or even markets and can enhance the trader's ability to set entry and exit points for separate assets or whole portfolios as technical analysis tools and composite price history become available.

29 Claims, 23 Drawing Sheets

THE EXAMPLE IS PREPARED IN ANALYTICAL PLATFORM NETTRADEX.

INSTRUMENT INFO

TRADE OPERATIONS TO BUYING ONE UNIT OF &AUD+CAD+NZD/CHF+EU~

| BASE | QUOTATION |
|---|---|
| BUY 1000.00 AUDUSD | BUY 2446.62 USDCHF |
| SELL 486.20 USDCAD | Sell 303.40 EURUSD |
| BUY 3000.00 NZDUSD | Sell 606.80 GBPUSD |

[ SAVE ] [ SAVE AS ] [ CLOSE ]

CREATING PCI STRUCTURE  THE STRUCTURE CAN BE SAVED

INSTRUMENT BROWSER

LOOK FOR

INSTRUMENT
- ☐ &2
- ☐ &3
- ☐ &4
- ☐ &AUD/USD
- ☐ &AUD+CAD+NOK+NZD /
- ☑ &AUD+CAD+NZD/CHF+E
- ☐ &BRENT / OIL
- ☐ &BRENT / ORJUICE
- ☐ &CAC40 +DAX +FTSE100-
- ☐ &COFFEE / COCOA
- ☐ &DIS+HD+HON+IBM+KO
- ☐ &DIS+HD+HON+IBM+KO
- ☐ &DIS+HD+HON+IBM+KO
- ☐ &DIS+HD+HON+IBM+KO

INSTRUMENT INFO

NAME: &AUD+CAD+NZD/CHF+EU~
CATEGORY: MY INSTRUMENTS

| CAD | +0.0% |
| AUD | -0.1% |
| NZD | -0.1% |
| EUR | -0.0% |
| GBP | -0.1% |
| CHF | -0.1% |
| TOTAL | +0.0% |

PERSONAL COMPOSITE INSTRUMENT

[ ADD TO USED INSTRUMENTS ]    [ CLOSE ]

☑ CLOSE AFTER ADDITION

COMPOSITE PORTFOLIO TRADING METHOD, CREATION AND ANALYSIS SYSTEM

BACKGROUND

Field of the Disclosure

The present invention relates to the field of electronic trading and investment monitoring, and relates more specifically to a system, method and computer-readable medium for generating and displaying a composite value of a complex instrument consisting of two sets (portfolios) of assets.

Related Art

Traders of foreign currencies, equities and commodities and the like are often interested in the performance of indices or portfolios of assets to indicate market, sector or asset trends in which they are interested. A number of published market indices, such as the S&P 500 and the Dow Jones Industrial Index provide an indication of market movement or other market trends for an entire market or sector. However, traders often find it advantageous to track or to trade on more than one market or more than one exchange at the same time, or to analyze trends on more than one market, sector or exchange, or to compare performance of markets, sectors or similar assets. Further, traders often find it advantageous to design their own market indicators. For example, Claus et al., U.S. Pat. No. 7,873,565, incorporated in its entirety herein by reference, allows the processing of a composite trading order to allow the trader to generate a composite value with a single action. However, Claus does not provide a customizable independent financial instrument that would be a product of a composite order and could be interpreted as a composite dynamic relation of two sets of assets.

According to principles of modern portfolio theory, developed for instance by Harry Markowitz and other famous economists, the problem of making composite portfolios entails the relationship between financial assets, diversification and management of risks, portfolio structure optimization. The method disclosed herein allows portfolio construction that is simple and best suits individual needs of an investor, taking into account his risk-return profile.

Foreign currency exchanges often feature prices of trading instruments as a base asset, B, traded against a quoted asset, Q. The quoted asset is commonly used as a reference or "counter currency" to express a relationship between two currencies or to express a value of a currency in terms of a second currency. For example, B/Q might reflect the €/USD (Euro/U.S. dollar), so that B/Q might be conveniently expressed as 1.250, or 1€=$1.25. According to an aspect of the present invention, instead of currencies the method places two combinations of assets or two portfolios (B—base portfolio, Q—quoted portfolio). Comparison of the values of two portfolios leads to creation of an independent entity, a composite instrument. The "price" of the instrument represents the number of quoted portfolios currently having the same value as the base portfolio or in other words the value of the base portfolio expressed in a quantity of the quoted portfolio or can be treated as an "exchange rate" of the two portfolios.

However, there is a need among traders for a more customizable portfolio indicator to facilitate technical analysis and technical analysis tools and visualization, and to offer a fresh look at relationships and correlations, revealing hidden interrelations between different assets, market-traded items and trading instruments, to compare markets or investment alternatives over time, to create and test investment strategies based on complex interrelations between financial assets. By combining different assets and setting for them individual weights in a portfolio, the method converts two sets of assets into a separate financial entity and therefore allows creation of unique personal composite instruments. Therefore, the user avoids limitation of the number of financial instruments available to him and comes to creation of his own product, an idea or a strategy implemented with a computer-based solution by constructing composite instruments which have their own price history and are ready for broad analytical work. An advantage of this approach is its flexibility and universality which opens up new horizons for analysis and trading, allotting the user with the function of creating financial products. The user's resourcefulness and inventiveness can be brought to bear on the asset allocation as any marketable assets can be selected for the base or quoted portfolio. Therefore the method can be useful for any type of investment preferences and for creating and testing a wide variety of investment strategies. As the number of such combinations is theoretically unlimited, the user may create an unlimited number of composite instruments.

SUMMARY

Disclosed is a method, system, computer-readable medium and means for enabling a trader to create, to track, to study historical performance, to perform technical analysis on, to share, to edit, to review performance and to trade assets of a composite instrument, or the composite instrument itself, that includes a first (base) portfolio with a first set of assets and their respective quantities, and a second portfolio (quoted) with a second set of assets and their respective quantities, the first portfolio "traded against" the second portfolio. The method can be also treated as a universal converter, enabling a trader to determine "exchange rate" between two combinations (portfolios) of assets, to track, to study historical performance and interrelations, to build investment strategies and perform trading operations.

Many different combinations of assets exist and thus the personal composite method can open new opportunities for analysis and trading. Users may construct their own financial instruments in accordance with their individual needs, requirements and limitations through building composite instruments of varying degree of complexity and reaching near absolute flexibility by assigning each asset an individual weight in the overall structure. When one portfolio is divided to another, a new technical instrument can be created. The fundamental and physical meaning of deviation is exchange of one portfolio against another similar to exchange rate in forex market. The function of personal composite instrument (PCI) during the time is variation of exchange rate of one portfolio (instrument) against another.

Theoretically unlimited number of possible composite instruments may increase considerably the number of trading opportunities. The instrument can help reveal market, sector or asset valuation trends, needed for macroeconomic analysis or to reveal hidden interrelations between assets or times of anomalous behavior of financial assets. Also it can be applicable in portfolio creation and optimization process leading to risk diversification benefits or it can be helpful in comparing investment alternatives as portfolios can be expressed and graphed in absolute values or in relation to any benchmark or in relation to each other. Many trading strategies may be tested under the method, including spread trading, mean-reversion trading, searching for a stable relationship and so on. It can be used as a hedge instrument in case of substantial reduction of composite price sensitivity to a desirable factor. As there are two sets of assets in a composite instrument strategies may also assume taking both long and short positions.

The computer-readable medium incorporates instructions, when executed by a computer, receive user selection of a first portfolio of assets and user selection of a second portfolio of assets and generates a user report of a personal composite instrument value. Such instructions can include: user interface instructions to enable the user selection of the first (base) portfolio of assets, by enabling user selection of: a first asset of the first portfolio and a quantity of the first asset of the first portfolio, a second asset of the first portfolio, and a quantity of the second asset of the first portfolio.

The instructions further can include user interface instructions to enable the user selection of the second (quoted) portfolio of assets, by enabling user selection of: a first asset of the second portfolio of assets and a quantity of the first asset of the second portfolio, and a second asset of the second portfolio of assets and a quantity of the second asset of the second portfolio.

Further included can be asset price generating instructions configured automatically to receive from a real-time market data stream a first trading price of the first asset of the first portfolio, a first trading price of the second asset of the first portfolio, a first trading price of the first asset of the second portfolio, and a first trading price of the second asset of the second portfolio. Alternatively, the current market prices of all assets may be "captured" at initiation of composite instrument construction process, before the user chooses assets and indicates quantities. Therefore those prices may not coincide with the latest market prices available. However after the instrument construction is completed, its price may be constantly recalculated using the latest market data.

In addition, the instructions include portfolio processing instructions to cause the computer automatically to calculate a first value of the first portfolio according to a first trading price of the first asset of the first portfolio and the quantity of the first asset of the first portfolio, and according to a first trading price of the second asset of the first portfolio and the quantity of the second asset of the first portfolio, and to calculate a first value of the second portfolio according to a first trading price of the first asset of the second portfolio and the quantity of the first asset of the second portfolio, and according to a first trading price of the second asset of the second portfolio and the quantity of the second asset of the second portfolio.

Further, the personal composite instrument calculating instructions calculate a first value of the personal composite instrument by dividing the first value of the first portfolio by the first value of the second portfolio; and then the user report generation instructions report the first value of the personal composite instrument.

The computer-readable medium may further include: tick tracker instructions to generate a user report of a new value of the personal composite instrument by tracking in real time a current value of the first asset and the current value of the second asset of the first portfolio and calculating a new value of the first portfolio accordingly, by tracking the current value of the first asset and the current value of the second asset of the second portfolio and calculating a new value of the second portfolio accordingly, and by calculating and reporting the new value of the personal composite instrument based on the new value of the first portfolio and the new value of the second portfolio.

The first asset of the first portfolio and/or the first asset of the second portfolio may be a market item traded on a foreign currency exchange, a market item traded on a stock market or equities exchange, a market item traded on commodities exchange, or may be a published market index or a derivative financial instrument or other marketable instrument, such as contracts for difference (CFDs).

A graphical user interface can be provided to generate a graph of values of the composite instrument over a time frame, wherein the time frame is selected according to user input. The graphical user interface can provide graphics representing technical tool results drawn on the graph, wherein the technical tool is selected according to user input.

Also, the instructions further may include: user interface instructions configured to enable receipt of a user instruction to trade one or more of the assets represented by the personal composite instrument; order generating instructions configured to generate a trade order according to the instruction to trade and to communicate the trade order to a trading platform; and instructions to report confirmation of the trade to the user.

The instructions may further include: user interface instructions configured to enable receipt of a user instruction to trade all of the assets represented by the personal composite instrument, in response to one instruction received from the user; and order generating instructions configured to generate a trade order according to the user instruction to trade.

The instructions may enable a user to share his personal composite instrument created with a second user.

The instructions may include: instructions to enable a user to input an alert request specifying user selection of a target composite instrument value; and instructions automatically by the processor to generate and to provide a user alert when the target composite instrument value is reached. The alert request may allow the user to specify an asset of the first or second portfolios that is of interest, and the user alert generated may indicate the asset of interest and a current or trading price thereof.

The instructions may further include: trade ordering instructions configured to enable a user to order a trade of one or more units of the composite instrument; and order execution instructions configured to place an order for the execution of the trade based on the order received.

The instructions may further include: first trade ordering instructions configured to enable a user to order long position trades of the assets of a specified portfolio of the first and second portfolios of the composite instrument; second trade ordering instructions configured to enable the user to order short position trades of the assets of a remaining portfolio, other than the specified portfolio, of the first and second portfolios of the composite instrument; and order execution instructions configured to place orders for the execution of the trades of the assets of the first specified portfolio and to place orders for the execution of the trades of the assets of the second specified portfolio based on the orders received. For example, to trade long on the composite instrument, that is, to buy the PCI (or some specified quantity of the PCI), considered by the system as a separate financial instrument, assets of the first portfolio in the quantities indicated by the PCI are bought AND assets of the second portfolio in the quantities indicated by the PCI are sold. To go short on the composite instrument, that is, to sell the PCI (or some specified quantity thereof): assets of the first portfolio in the quantities indicated by the PCI are sold, and assets of the second portfolio in the quantities indicated by the PCI are bought.

Also disclosed is a system that includes the computer-readable medium incorporating instructions executed by the computer, the system further comprising remote user instructions configured to be executed by a second computer, the second computer being an electronic communication over the network with the computer and being remote from the computer, the remote user instructions comprising: instructions to provide a graphical user interface on a computer display connected to the second computer and to enable user selection of the first portfolio of assets and the second portfolio of assets; and instructions to present the first value of the personal composite instrument reported to a user at the second computer by the remote instructions.

Further, a method is provided as follows: A method of receiving by a computer user selection of a first portfolio of assets and user selection of a second portfolio of assets and generating a user report of a personal composite instrument value, the method comprising:

enabling the user selection of the first portfolio of assets and the second portfolio of assets, by enabling selection of:

one or more assets of the first portfolio and a quantity for each asset of the first portfolio, one or more assets of the second portfolio of assets and a quantity of each asset of the second portfolio; and automatically receiving in real time, by the computer, from a real-time market data stream, a respective trading price of each asset of the first portfolio, and a respective trading price of each asset of the second portfolio;

calculating, automatically by the computer, a first value of the first portfolio according to the respective trading price of each asset of the first portfolio and the quantity of each asset of the first portfolio, and calculating, by the computer, a first value of the second portfolio, according to the respective trading price of each asset of the second portfolio and the quantity of each asset of the second portfolio;

calculating, automatically by the computer, a first value of the personal composite instrument by dividing the first value of the first portfolio by the first value of the second portfolio;

reporting, automatically by the computer, to a user the first value of the personal composite instrument; and generating a user report of a new value of the personal composite instrument by tracking in real time a respective current value of the at least two assets of the first portfolio and calculating a new value of the first portfolio accordingly, and by tracking in real time a respective current value of the at least two assets of the second portfolio and calculating a new value of the second portfolio accordingly. As discussed, the price may be received at initiation of portfolio construction procedure and not updated until after creation of the composite instrument has been completed.

The method further includes calculating, automatically by the computer, a first value of the first portfolio according to the first trading price of the first asset of the first portfolio and the quantity of the first asset of the first portfolio, and according to a first trading price of the second asset of the first portfolio and the quantity of the second asset of the first portfolio, and calculating, by the computer, a first value of the second portfolio according to a first trading price of the first asset of the second portfolio and the quantity of the first asset of the second portfolio, and according to the second asset of the second portfolio and the quantity of the second asset of the second portfolio;

calculating, automatically by the computer, a first value of the personal composite instrument by dividing the first value of the first portfolio by the first value of the second portfolio;

reporting, automatically by the computer, to a user the first value of the personal composite instrument; and generating a user report of a new value of the personal composite instrument by tracking in real time a current value of the first and second assets of the first portfolio and calculating a new value of the first portfolio accordingly, and by calculating the current value of the first and second assets of the second portfolio and calculating a new value of the second portfolio accordingly.

In such a method, one or more assets of the first portfolio and/or one or more assets of the second portfolio, or all assets of the first portfolio, and/or all assets of the second portfolio, may be market items, including ETFs, traded on an equities or stock market, market items traded on a foreign currency exchange, market items traded on commodities exchange, futures, or other contracts or derivatives of market items traded on such exchanges, market or sector indexes, or items traded over the counter.

Other features and advantages of the present invention will become apparent from the following description of the invention that refers to the accompanying drawings.

BRIEF DESCRIPTION OF THE DRAWINGS

FIG. 9 illustrates an example of a technical analysis tool-generated "Fibonacci extension" to facilitate technical analysis of the composite instrument, according to an aspect of the present disclosure.

FIG. 11 illustrates an example of a technical analysis tool-generated "Alligator indicator" to facilitate technical analysis of the composite instrument, according to an aspect of the present disclosure.

FIG. 23 illustrates an example of trading operations as necessary to replicate a purchase of one unit of a composite instrument, and a panel regarding percent changes of the assets' values of the composite instrument and the total percent change of the value of the composite instrument since its creation.

DETAILED DESCRIPTION OF THE EMBODIMENTS

According to an aspect of the present disclosure, a trader can select from hundreds or thousands of assets or financial instruments, specify their quantities, and thus create the contents of a first portfolio of assets and of a second portfolio of assets. One portfolio of assets can then be priced in terms of the second portfolio to create an independent composite instrument (sometimes referred to as a personal composite instrument). This allows for visualization of the value of the composite instrument and enables the use of technical analysis tools, user alerts, sharing, and trading of the composite instrument. The system allows for a variety of technical analysis tools and indicators for analyzing price history and for composite instrument price forecasting.

Figure 1:
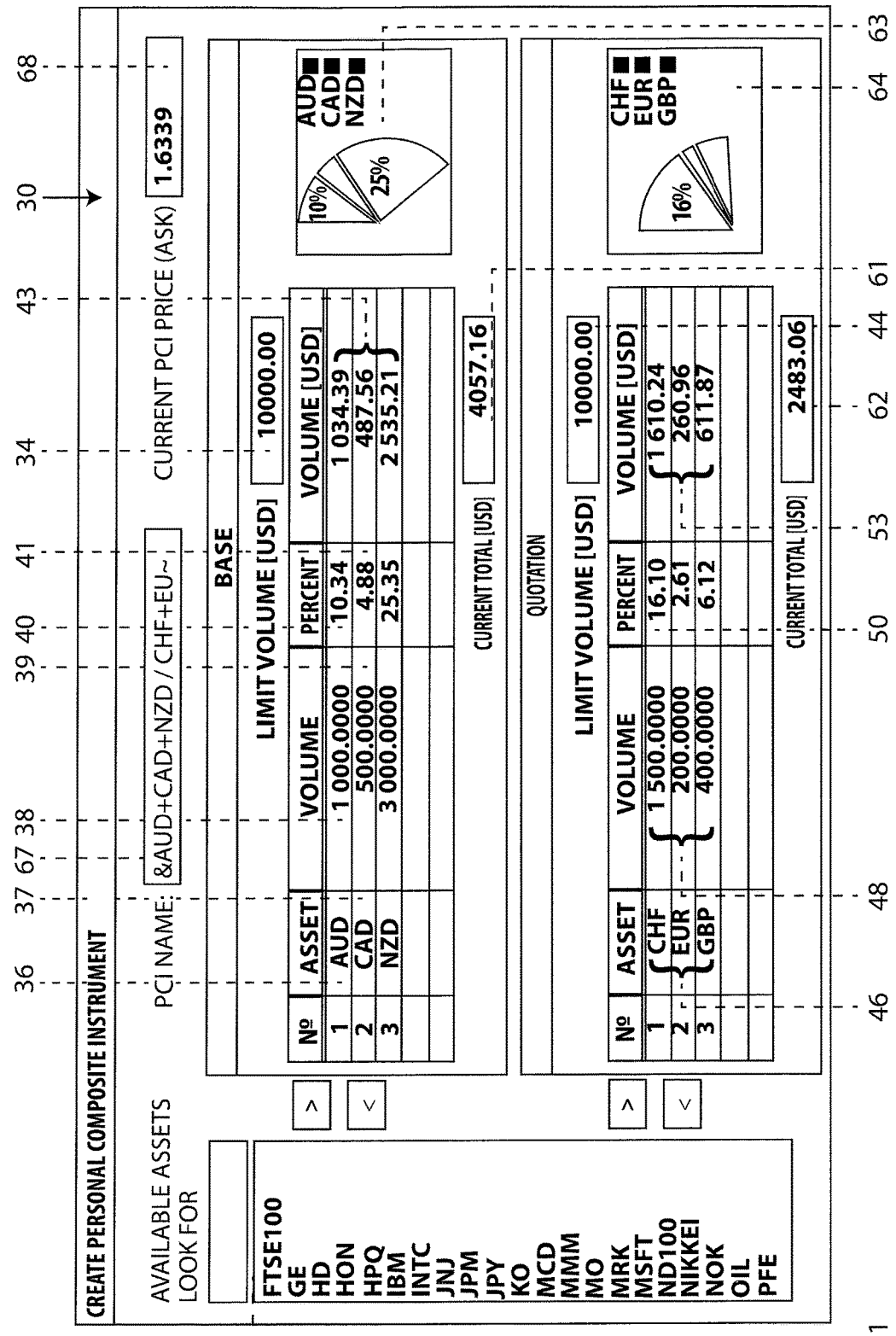
FIG. 1 illustrates an example of a graphical user interface to allow user designation of a first portfolio of assets and a second portfolio of assets to yield a composite instrument, according to an aspect of the present disclosure.

FIG. 1 illustrates a graphical user interface 30 that enables creation of the first (Base) portfolio of assets, and the first portfolio of assets will then be weighed against a second portfolio of assets (Quoted) to yield the composite instrument. Asset panel 31 of graphical user interface 30 illustrated in FIG. 1 allows the user to find and choose assets for the portfolio he wishes to create. Examples shown in FIG. 1 are forex examples, but it will be understood that many types of assets can be included in the first and/or the second portfolio, including equities and stocks traded on a stock market or other exchange or over the counter, bonds, including corporate, state, national, local, federal or regional bonds and other fixed income securities, real estate and mortgage-based securities, commodities, precious metals or other metals, oil or any number of market-traded items. Further, the assets to be included in the portfolio can include composites of such market-traded items, currencies, equities and commodities, as well as derivatives, such as futures, and other contracts, as well as market, sector or geographic region indexes. Asset panel 31 allows the user to search for a symbol representing an asset he likes for his portfolio or the user can click on one or more of the assets shown already populated thereon.

In the example illustrated in FIG. 1, the user has selected the Australian dollar, the Canadian dollar and the New Zealand dollar to comprise his first portfolio (Base). As shown in volume panel 38, the user has selected 1,000 AUD, as shown in volume panel 39 he has selected 500 CAD, and he has selected 3,000 NZD. The upper limit volume indicator 34 shows a total amount, in this case indicated in the USD that the trader may "spend" for the first portfolio. This upper amount may be changed by the user, according to an aspect of the invention, or may be limited by a supervisor, according to an aspect of the invention. The percent panel 40 illustrates the percentage of his overall allotment in AUD relative to the limit volume and the second percent panel 41 illustrates the total allotment for his portfolio that he has in CAD. Volume panel 43 expresses in U.S. dollars the respective price of each asset of the first portfolio. Current total panel 61 shows the total U.S. value of the first portfolio, while pie chart panel 63 shows that of the total maximum allotment for the first portfolio, the trader has the various percentages shown in each asset. It will be understood that a user may select the quantities for each asset of the first portfolio by inputting or selecting a volume in volume panels 38, 39 etc., or the user may specify the volume expressed in U.S. dollars using U.S. dollar volume panel 43. Or, the user may specify volumes in percentage terms in volume panels 40, 41 etc. In addition, a user may select the volume by moving the cursor to control the pie chart shown in pie chart panel 63.

Similarly, graphical user interface 30 shows a second (quoted) portfolio on the bottom denoted as the "quotation." The second portfolio is shown as comprised of 1,500 CHF, 200 EUR, and 400 GBP. These assets comprise respectively 16.1, 2.61 and 6.12 percentage of his total allotment, shown in this example for purposes of illustration as 10,000 dollars for the second portfolio, as illustrated in percent panel 50. The percentages are shown in percent panel 50 and the total allotment allowed for the second portfolio is shown in limit volume bar 44. The percentage that each asset of the second portfolio comprises of the total limit volume is shown by pie chart panel 64. The total current USD value of the second portfolio is shown in current total panel 62 as 2,483.06. The assets of the second portfolio and their quantities may be selected in a manner similar to the selection of the first portfolio. In this way, the user has populated the first and second portfolio with chosen assets, has designated the volume or quantity of each asset, and has thus created the "base" portfolio and "quoted" portfolio. Accordingly, a market data stream can be input to the system so that as the value of each underlying asset of the first portfolio and the second portfolio changes, the current value of the personal instrument will change as well accordingly and will be reported to the user.

The composition of the composite instrument is then shown in composition bar 67. Based on the current trading price of each asset of the first and second portfolios the current composite instrument price is displayed in price bar 68. ASK price, that is a price of purchase from the user's side, is shown in the price bar 68, however it is assumed that BID price, that is a price of sale from the user's side, according to the latest market data, may also be received and may be used to update the portfolio values. In the illustrative example shown in FIG. 1 that value is 1.6339. This value is equal to the ratio of the first portfolio value to the second portfolio value. More formally expressed, if the first composite portfolio (B, base) and the second portfolio (Q, quoted) are denoted as:

$$B = \sum_{i=1}^{K} Vi * Ai \qquad Q = \sum_{j=1}^{N} Vj * Aj$$

where:
$A_{i,j}$=assets traded in the system, priced or recalculated in US dollars (however it will be understood that any other currency unit may also chosen as the base);
$V_{i,j}$=volume (quantity) of asset i,j
K is the number of assets in the Base portfolio, and
N is the number of assets in the Quoted portfolio.
Then, the composite instrument trading concept is based on trading instrument B against instrument Q, trading as pair B/Q, or $$\frac{PCI}{GeWorko} = \frac{\sum_{i=1}^{K} Vi * Ai}{\sum_{j=1}^{N} Vj * Aj}.$$

It may be assumed that asset prices are already in US dollars here.

To calculate a trader's P/L (profit/losses) ratio for the day or for a period of trading in USD for composite instrument trading the following equation can be used:

$$P/L=V*(Tc-To)*Qc=V*(Bc/Qc-Bo/Qo)*Qc=V*(Bc-Bo)-V*(Qc-Qo)*To$$

where:
V is trading volume (number of composite instruments);
$T_O$ and $T_C$ are composite instrument's values or quotes at open and close of trading, respectively.
Bo—value of the first (Base) portfolio at open
Bc—value of the first (Base) portfolio at close
Qo—value of the second (Quoted) portfolio at open
Qc—value of the second (Quoted) portfolio at close
Or, if US dollar is assumed to be the base currency:

$$P/L = V * \sum_{i=1}^{n} Vi*(Ai/USDc - Ai/USDo) - \\ V*To*\sum_{j=n+1}^{N} Vj*(Aj/USDc - Aj/USDo)$$

Vi—volumes of assets Ai of the Base portfolio
Vj—volumes of assets Aj of the Quoted portfolio
Ai/USD o—US-dollar price of asset Ai at open
Ai/USD c—US-dollar price of asset Ai at close
Aj/USD o—US-dollar price of asset Aj at open
Aj/USD c—US-dollar price of asset Aj at close
Therefore, the P/L ratio for composite instrument trading can be a linear combination of long and short positions taken on those assets that have been selected to build the composite instrument, each of them with a composite corresponding weight. The terms long position trade, or trading long, and short position trade, or trading short, are well known by traders and financial analysts, and very generally mean, respectively, a trade in which the user initially buys the asset expecting the price of the asset to increase, and a trade in which the user initially sells the asset expecting the price of the asset to decrease. Thus, the trader is able to build portfolios, open charts of the base and quoted portfolios and a chart of the composite instrument and to apply methods of technical analysis on each of them. In addition, the user can trade one portfolio against another. The position represented by the composite instrument can be totally replicated by substituting in the values of the underlying assets and their respective quantities, as explained later and shown in the FIG. 23.

Figure 3:
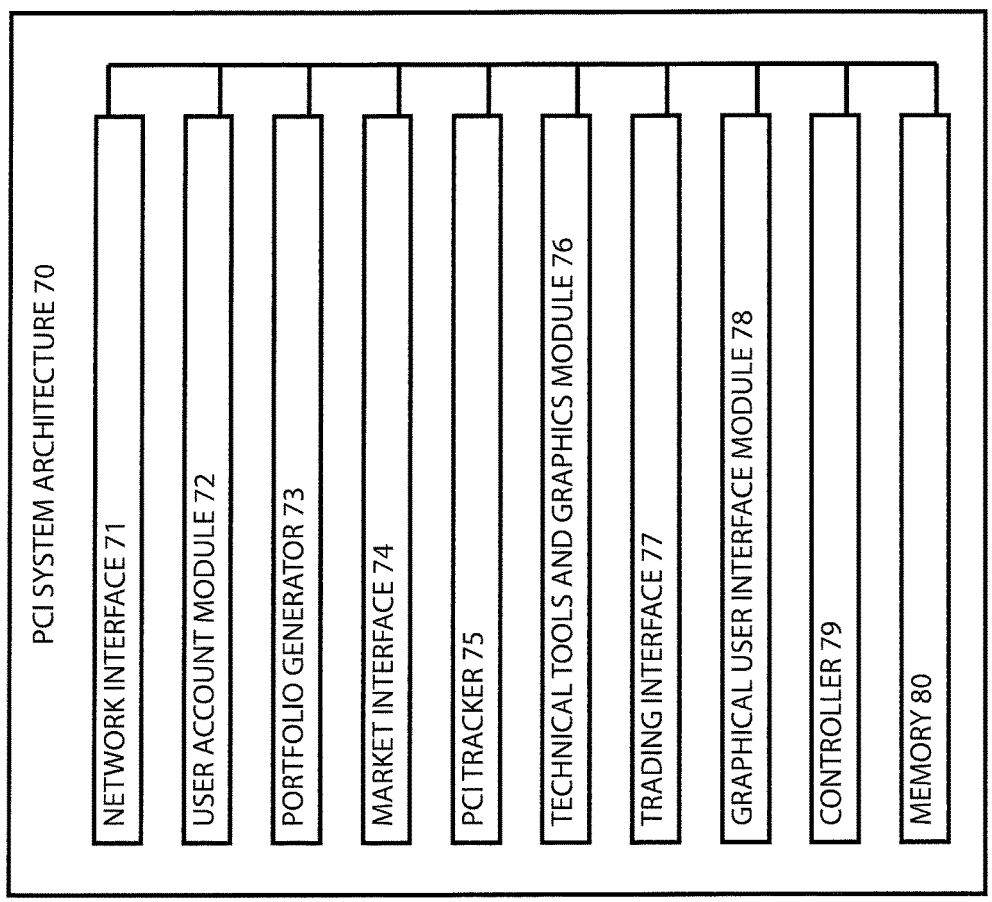
FIG. 3 illustrates an example of a composite instrument system architecture, according to an aspect of the present disclosure.
Figure 4:
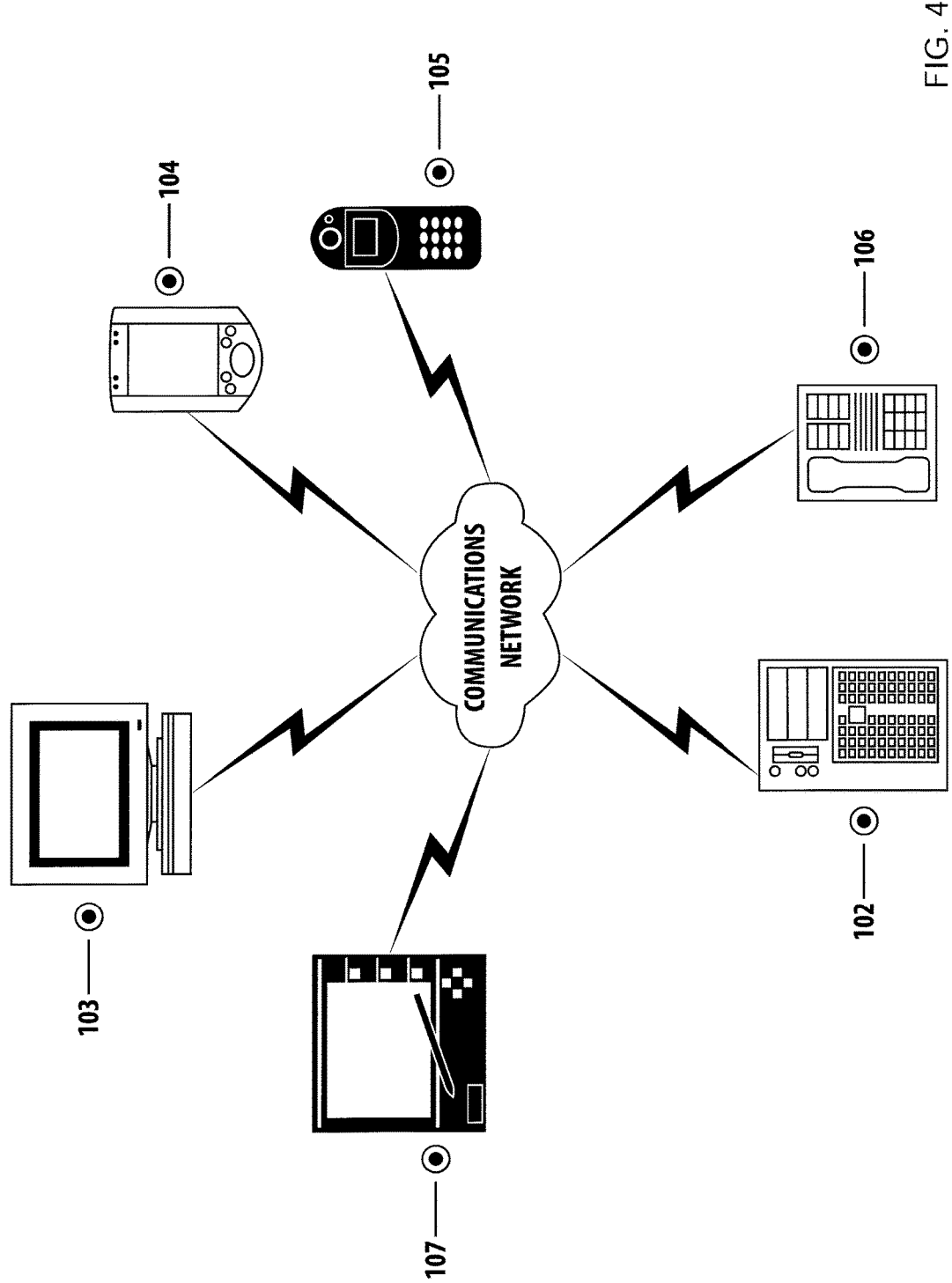
FIG. 4 illustrates examples of devices that may be used to communicate over a communications network with a machine incorporating the composite instrument architecture, according to an aspect of the present disclosure.

As illustrated in FIG. 4, a user can communicate with a computer or other type of processor-based device that hosts the composite instrument architecture 70 illustrated in FIG. 3, by accessing the computer device over a communications network 101, illustrated in FIG. 4. For example, FIG. 4 illustrates that a user may use a personal computer 103, a smartphone, e-reader, or other type of handheld or portable device 104, a cellular phone 105, a landline 106, and/or a tablet device 107 to communicate via communications network 101 with server 102, which can house the composite instrument system. Although shown as a server 102, it will be understood that more than one such device may host the system. The system may be based in the cloud or offsite, or may be based at the premises where the trader is located. Further, the server 102 may not be traditional computer but may be a tablet, smartphone, handheld or portable device, or a combination of such devices.

An example of a composite instrument system architecture and the steps user uses to create a composite instrument and to use a composite instrument will now be illustrated with reference FIGS. 3, 5 and 6.

The user accesses the composite instrument system 70 by logging on either onsite or in a remote location and authenticating his status as a subscriber or permitted user. For example, the system may be a user subscription-based system that allows users to use composite instrument system 70 for a period of time in exchange for a subscription price, or to make a number of trades for a set price, or may be a system 70 that may be sold or licensed, for example, as a software package, or accessed for an unlimited time in exchange for a fee.

Figure 5:
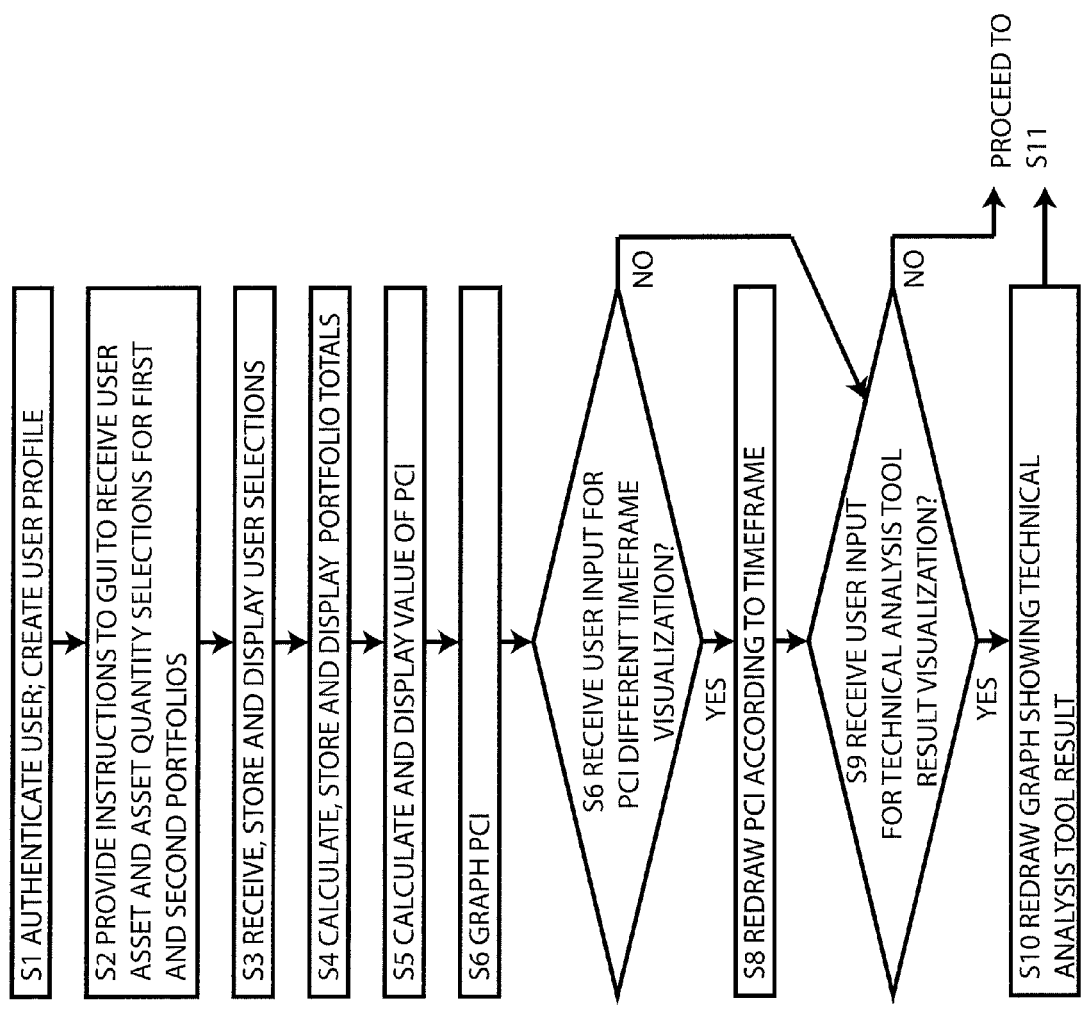
FIGS. 5 and 6 illustrate an example of a flowchart of steps performed by a machine to allow a user to generate and to use a composite instrument, according to an aspect of the present disclosure.
Figure 6:
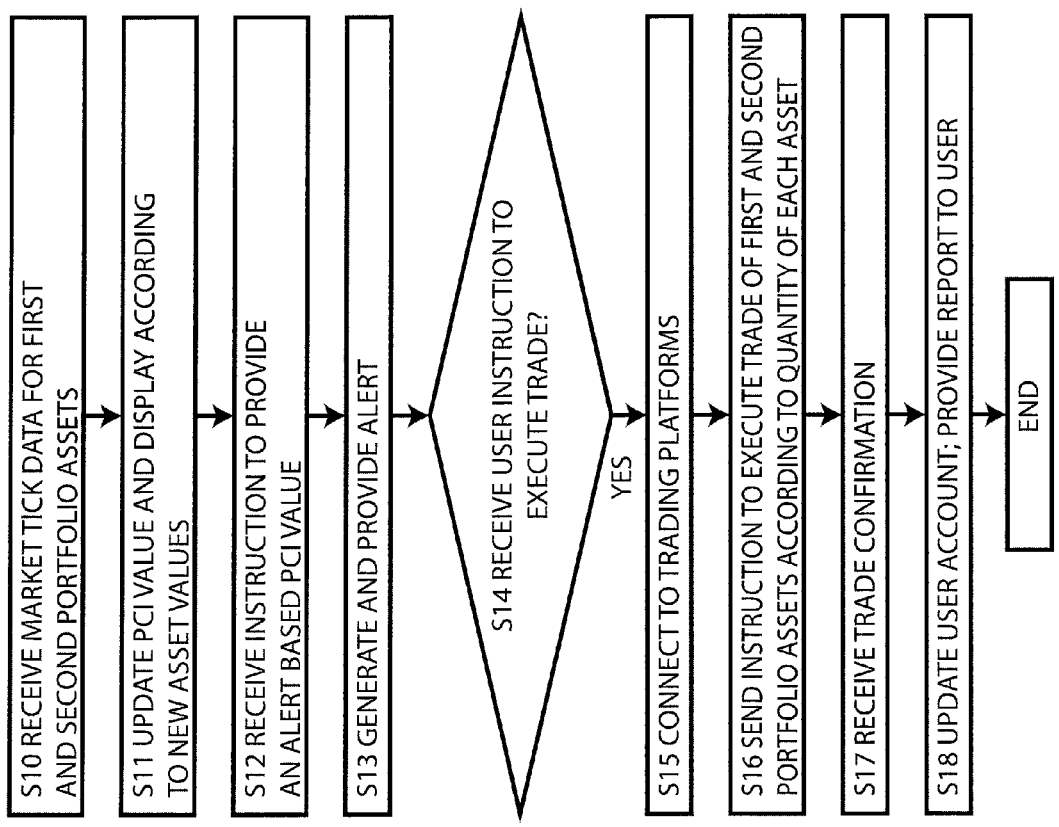

As shown in S1 of FIG. 5 the user is authenticated, for example, using a password or the like and the user can sign in, or the user can create a user profile if accessing the system for the first time.

The composite instrument system architecture 70 illustrated in FIG. 3 includes network interface 71 to receive and to respond to the authentication request and includes user account module 72 that processes the user authentication and user creation of the profile, as well as user subscription information and the like.

At S2 illustrated in FIG. 5, user creates the composite instrument by providing instructions to the graphical user interface to select user assets and user asset quantities for the first and second portfolios. As shown in FIG. 3, the composite instrument system architecture 70 includes a portfolio generator 73 that provides instructions to graphical user interface module 78 to generate the graphical user interface for the user to enable user selection of the assets and the quantities, and to provide percentage and pie chart information and the like, as shown in FIG. 1. At S3 shown in FIG. 5, the system receives the user's selection of assets and their quantities for each of the first and second portfolios, stores these selections and displays these selections to the user.

At S4, the system calculates the composite instrument value based on the current asset value the portfolio values and displays the portfolio totals to the user. For example, a system may interact with a real-time market data stream using market interface 74 illustrated in FIG. 3 to obtain the real-time current values of the assets underlying the first and second portfolios. The real-time market data streams may be obtained from a number of sources well known in the art, including directly from foreign currency, commodities or equities exchanges or the like, or from commercially available market data feeds.

Figure 21:
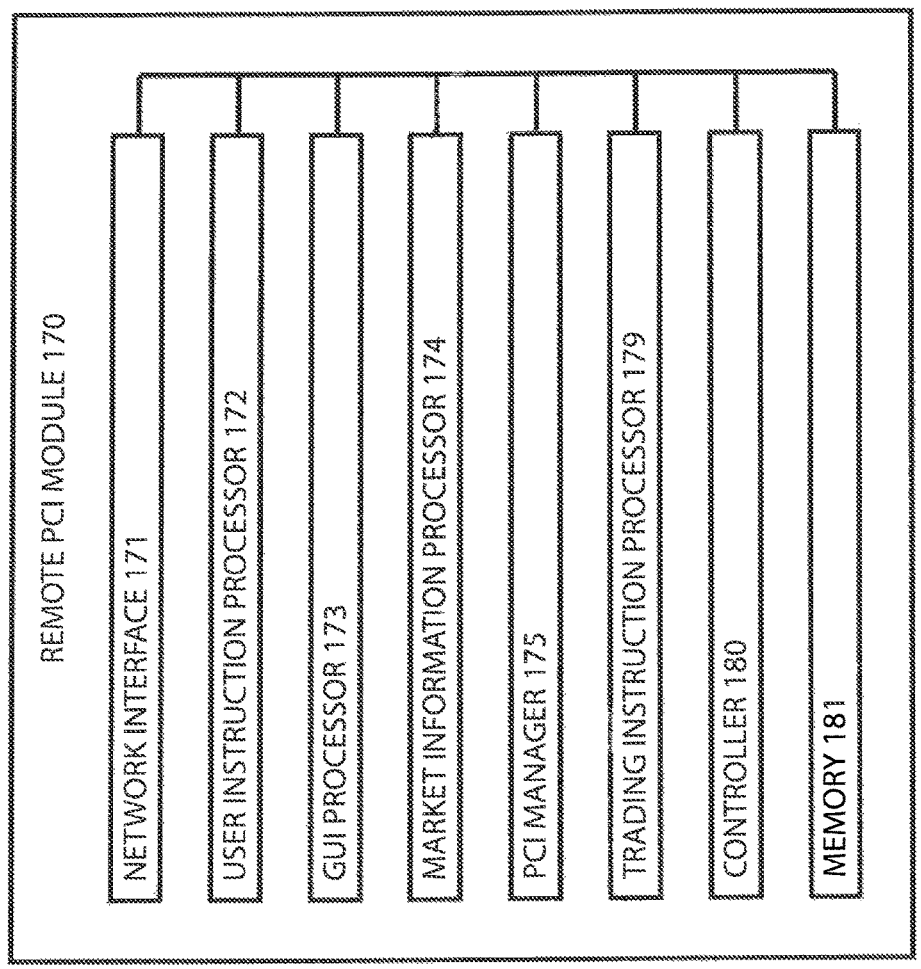
FIG. 21 illustrates an example of a remote composite instrument module, according to an aspect of the disclosure.

It will be understood that the user may interact with composite instrument system 70 on location or via network, such as a LAN, WAN, or the internet located off premises. FIG. 21 illustrates a remote composite instrument module 170 that may be a software application or the like downloaded to the user's home computer, tablet, e-reader or other portable device or the like, to enable the user to create the composite instrument and to apply technical analysis tools and to trade thereon from a remote location. Such a software package may be sold or licensed to a user, or may be available free to subscribers or users of the composite instrument system.

Using network interface 171 of remote composite instrument module 170 illustrated in FIG. 21, a user may interact with the composite instrument system using network interface 71 illustrated in FIG. 3, for example, to authenticate the user and the like.

User instruction processor 172 of remote composite instrument module 170 illustrated in FIG. 21 enables user to input instructions for creating the composite instrument by selecting assets and their respective quantities for the first and second portfolio, and GUI processor 173, illustrated in FIG. 21, provides instructions for the local graphics processor of the user's device to show the graphical interface created by graphical user interface module 78 of composite instrument system 70 illustrated in FIG. 3. The real-time market feed information may be input directly to remote composite instrument module 170 to provide current price information for the assets of the first and second portfolios and thus to generate the current composite instrument value. Thus, market information processor 174 may receive via network interface 171 the real-time market data stream. In the alternative, the market data stream may be received by market interface 74 of composite instrument system 70 shown in FIG. 3 and then be communicated to the remote composite instrument module 170 for display by command of GUI processor 173 of remote composite instrument module 170.

Thus, as shown in step S5 of FIG. 5, the system calculates and displays the value of the composite instrument and displays it the user, for example, in current price bar 68. Composite instrument tracker 75 of composite instrument system architecture illustrated in FIG. 3 keeps track of the composite instrument thus generated, including the assets of the first and second portfolios and their quantities, and also keeps track of the value over time of the composite instrument. User may also wish to give the composite instrument a name that is convenient to remember and a composite instrument tracker 75 can also keep track of the name of the composite instrument.

Figure 2:
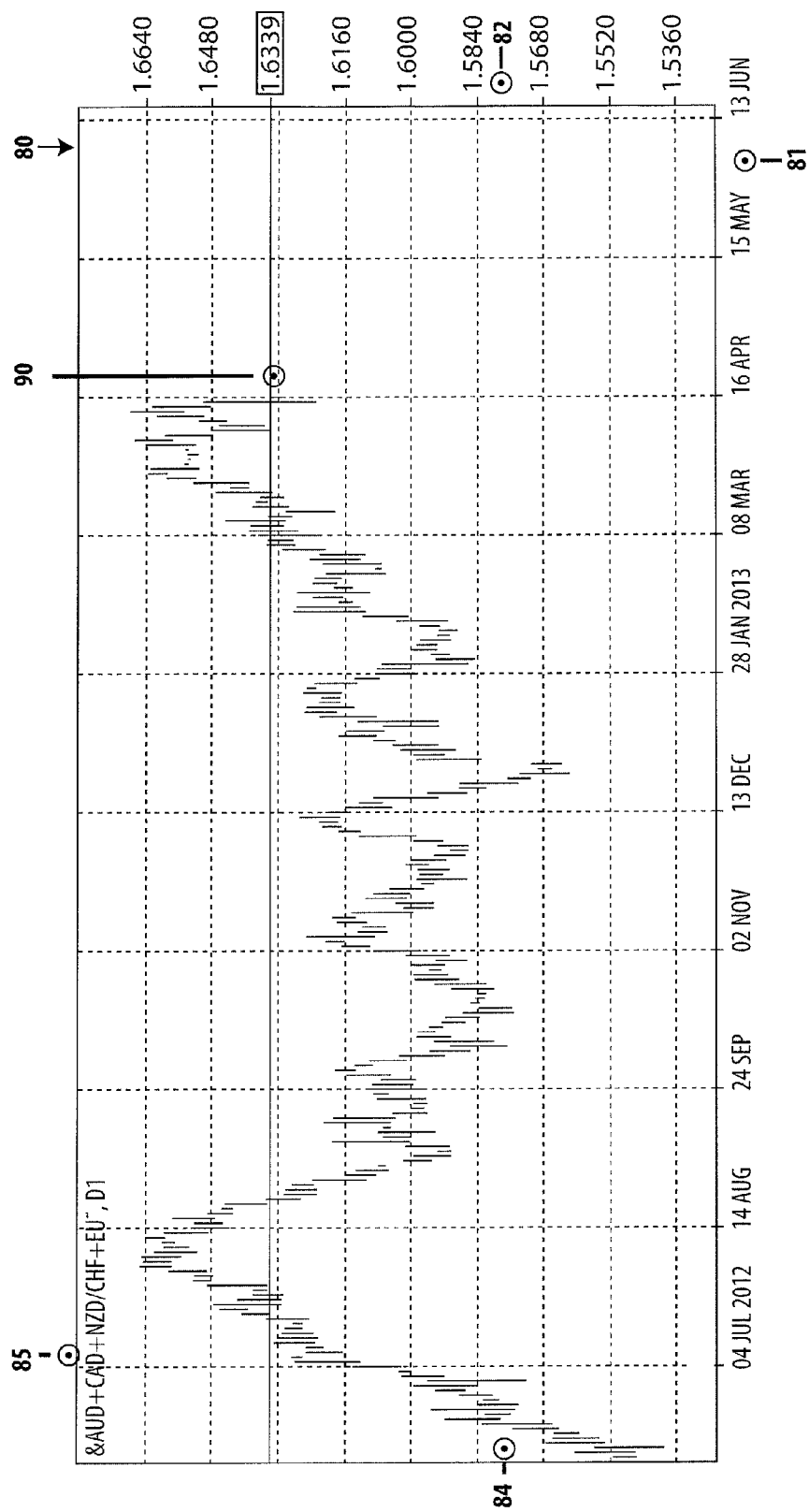
FIG. 2 is an example of a chart illustrating a graphical representation of the performance of a composite instrument over time, according to an aspect of the present disclosure.

As shown in S6, the system can graph the composite instrument, for example, as illustrated in FIG. 2. A user may choose a time frame, and may choose a time frame in the past. The user may wish to focus the time frame on intra day trading, or select a time frame that spans days, weeks, months, years or decades, depending on the user's preferences. FIG. 2 illustrates the value of the composite instrument on y axis 82, while x axis 81 shows the time span. User can select other timeframes and the system will then graph the composite instrument for the selected timeframes, as shown in S7 and S8 of FIG. 5.

Figure 7:
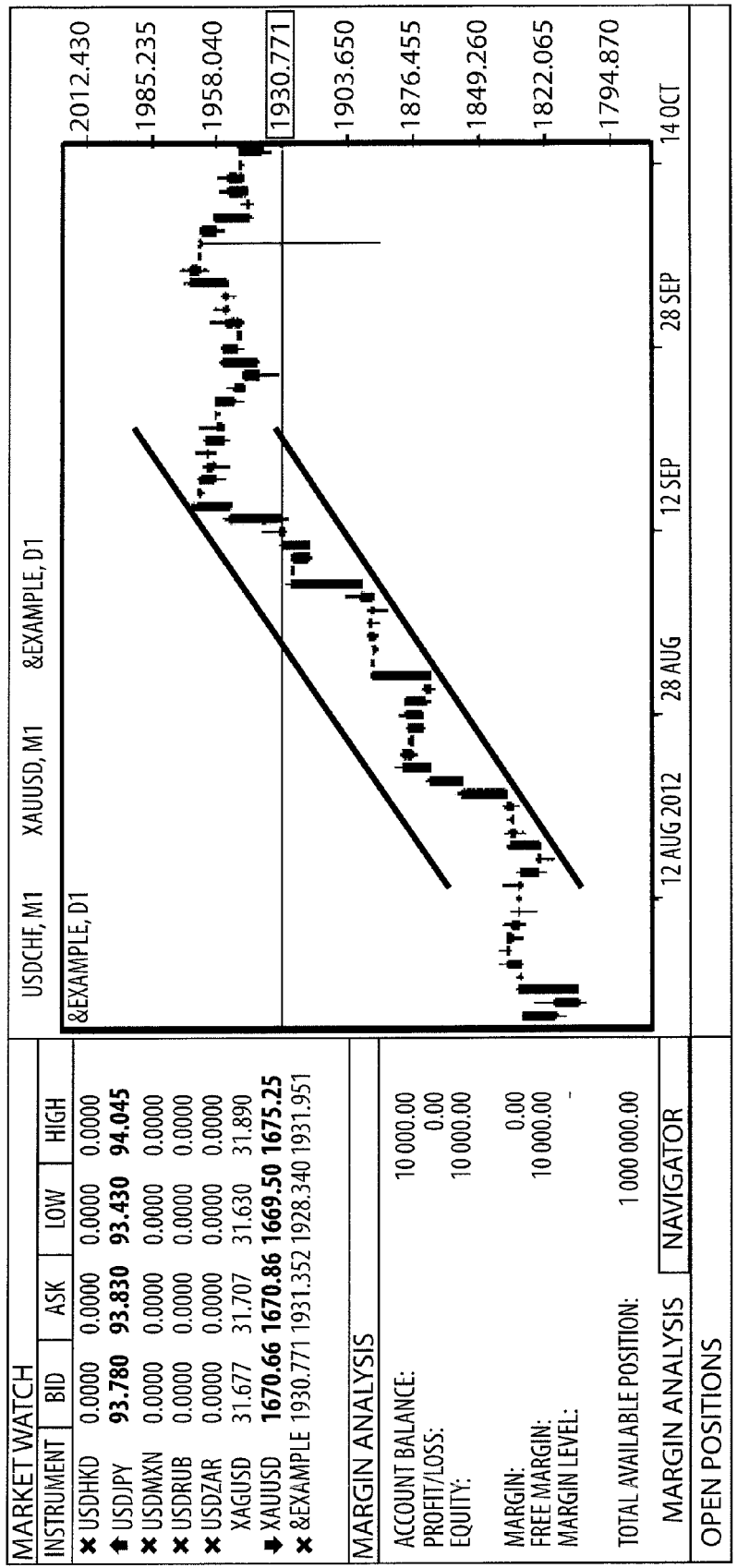
FIG. 7 illustrates an example of a technical analysis tool-generated "channel" to facilitate technical analysis of the composite instrument, according to an aspect of the present disclosure.

A number of technical analysis tools can also be used by the trader to aid in the visualization and analysis of the composite instrument and underlying assets or the portfolios of the composite instrument. As shown in S9, the user may input one or more technical tools that he wishes to use in composite instrument analysis, and at S10 the results of the technical analysis tools are shown to the user. For example, FIG. 7 illustrates a "channel" to aid the trader in analyzing the scope or the trend of the composite instrument. It will be understood that as further market data is received, market interface 74 may transmit the changed value of the assets of the first and/or second portfolios to composite instrument tracker 75, and graphic user interface module 78 may then redrawn the graph as appropriate. Some tools may be re-drawn automatically, as the user changes time spans or changes other criteria.

Figure 8:
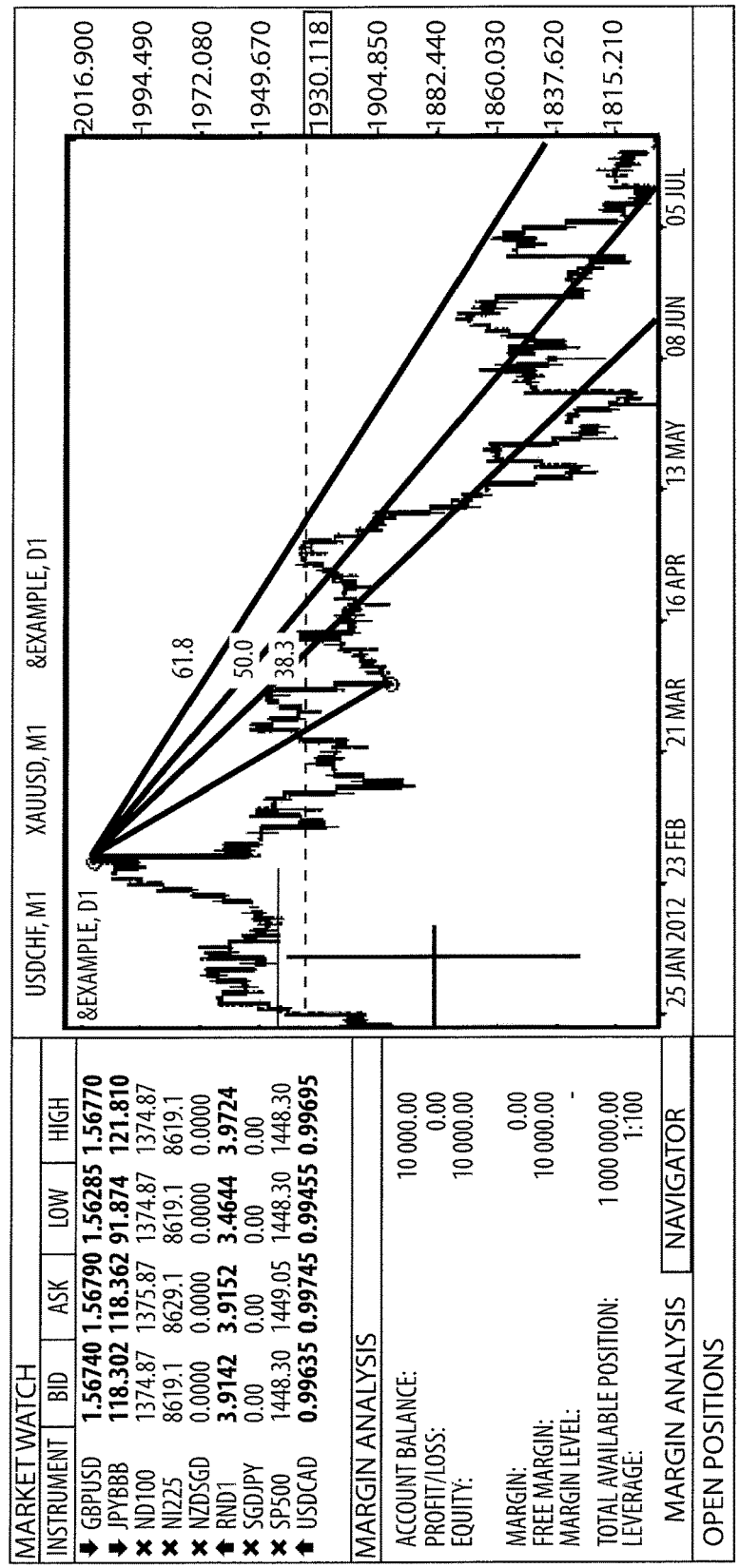
FIG. 8 illustrates an example of a technical analysis tool-generated "Fibonacci fan" to facilitate technical analysis of the composite instrument, according to an aspect of the present disclosure.
Figure 9:
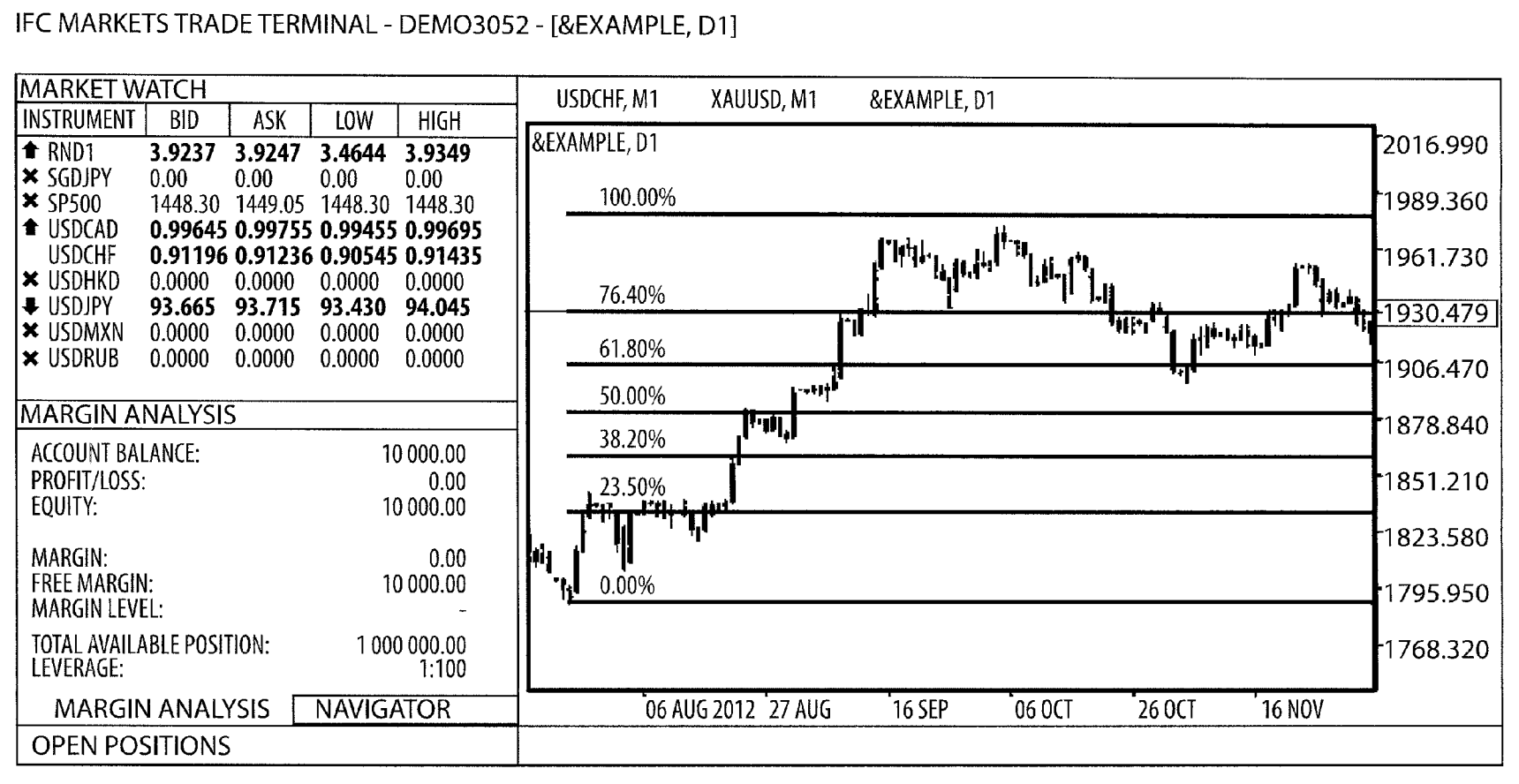
Figure 10:
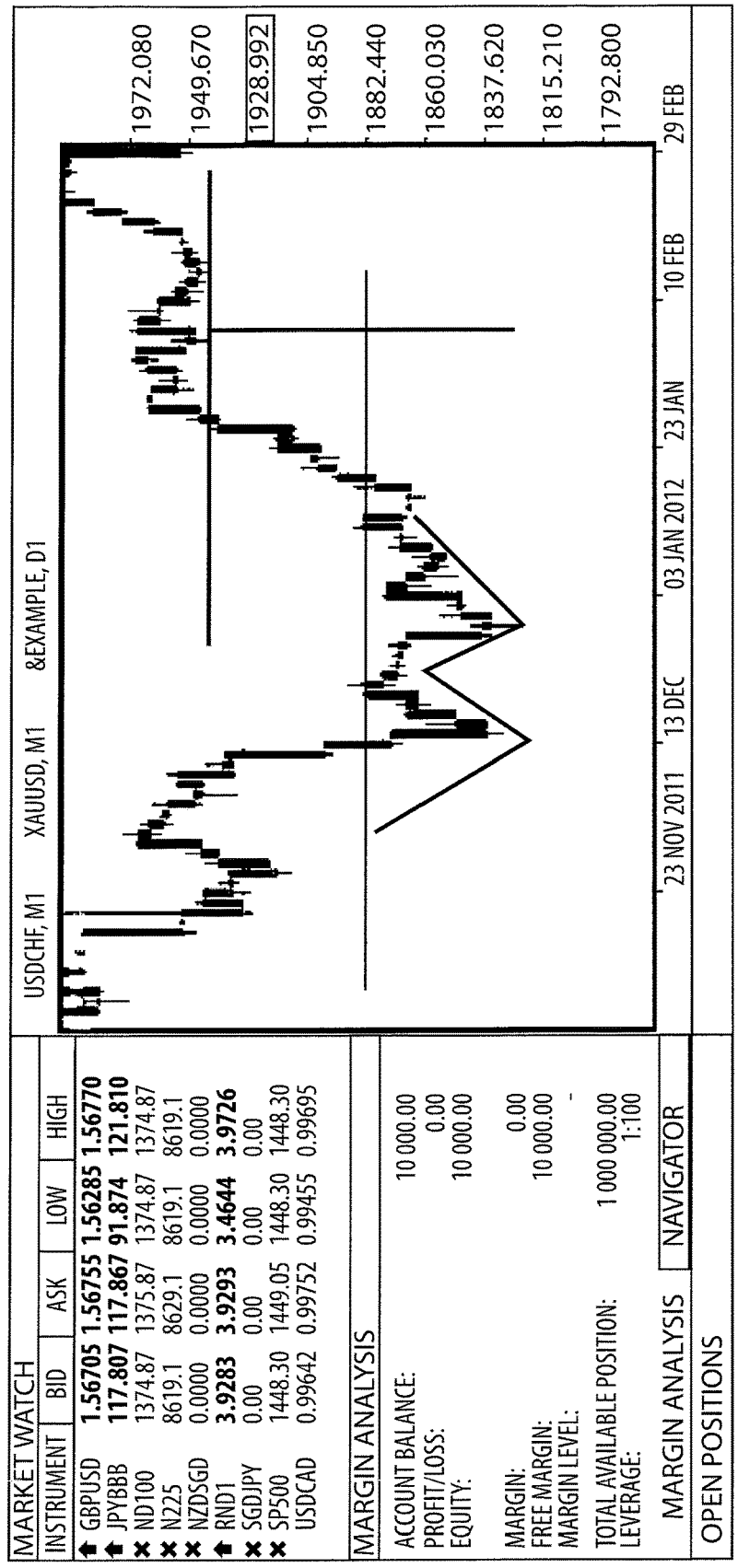
FIG. 10 illustrates an example of a technical analysis tool-generated "Double bottom chart pattern" to facilitate technical analysis of the composite instrument, according to an aspect of the present disclosure.
Figure 11:
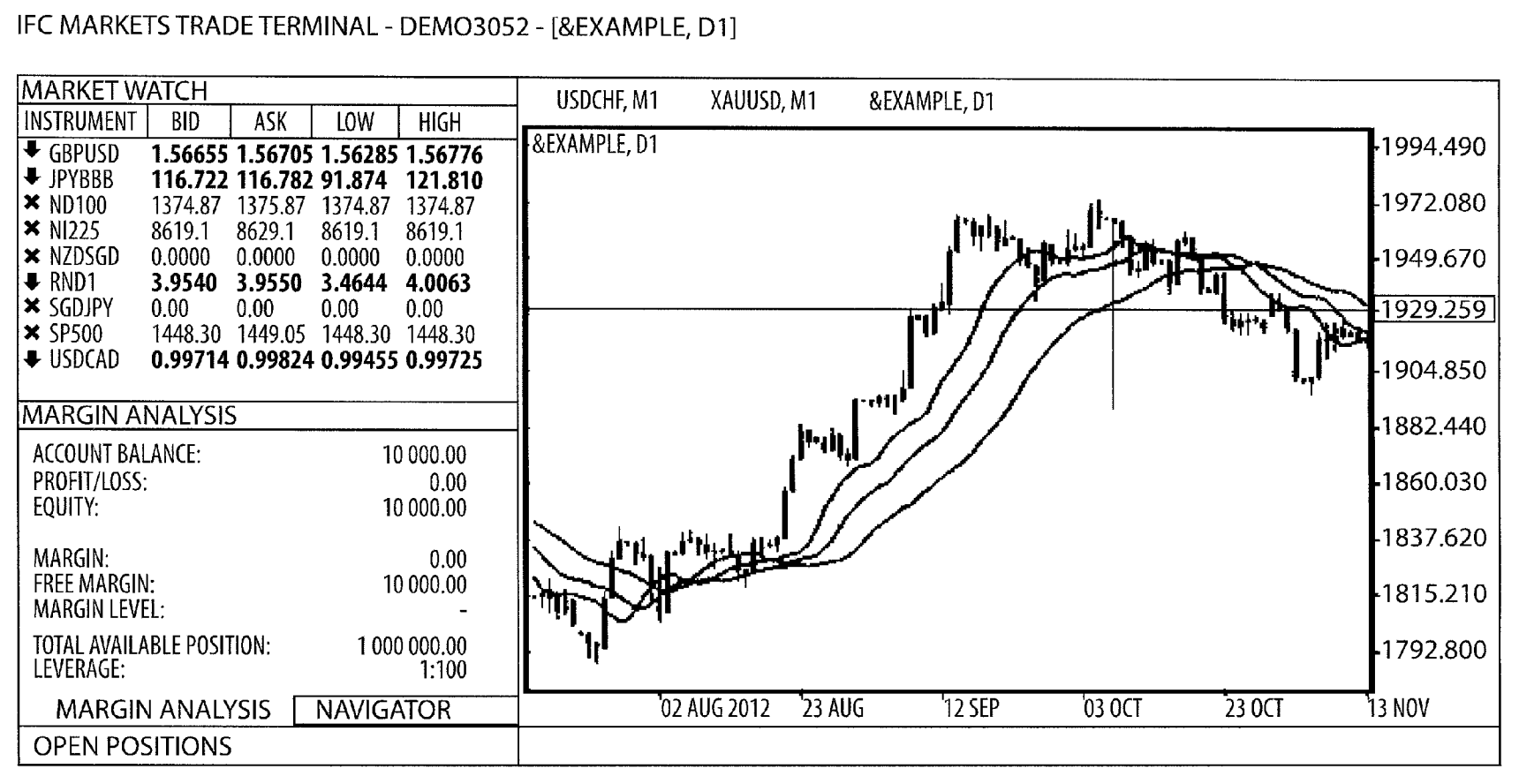
Figure 12:
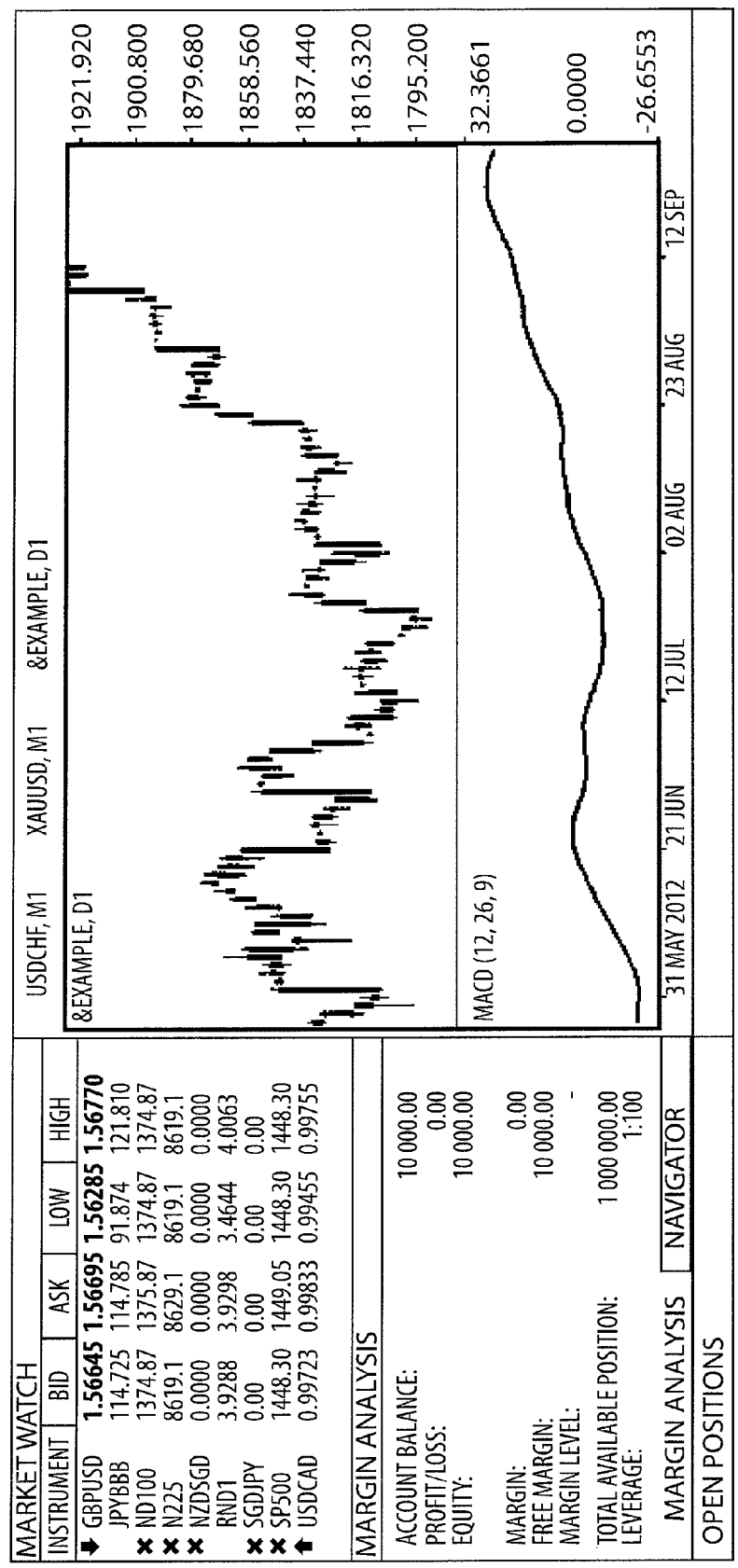
FIG. 12 illustrates an example of a technical analysis tool-generated "MACD" (moving average convergence/divergence) to facilitate technical analysis of the composite instrument, according to an aspect of the present disclosure.
Figure 13:
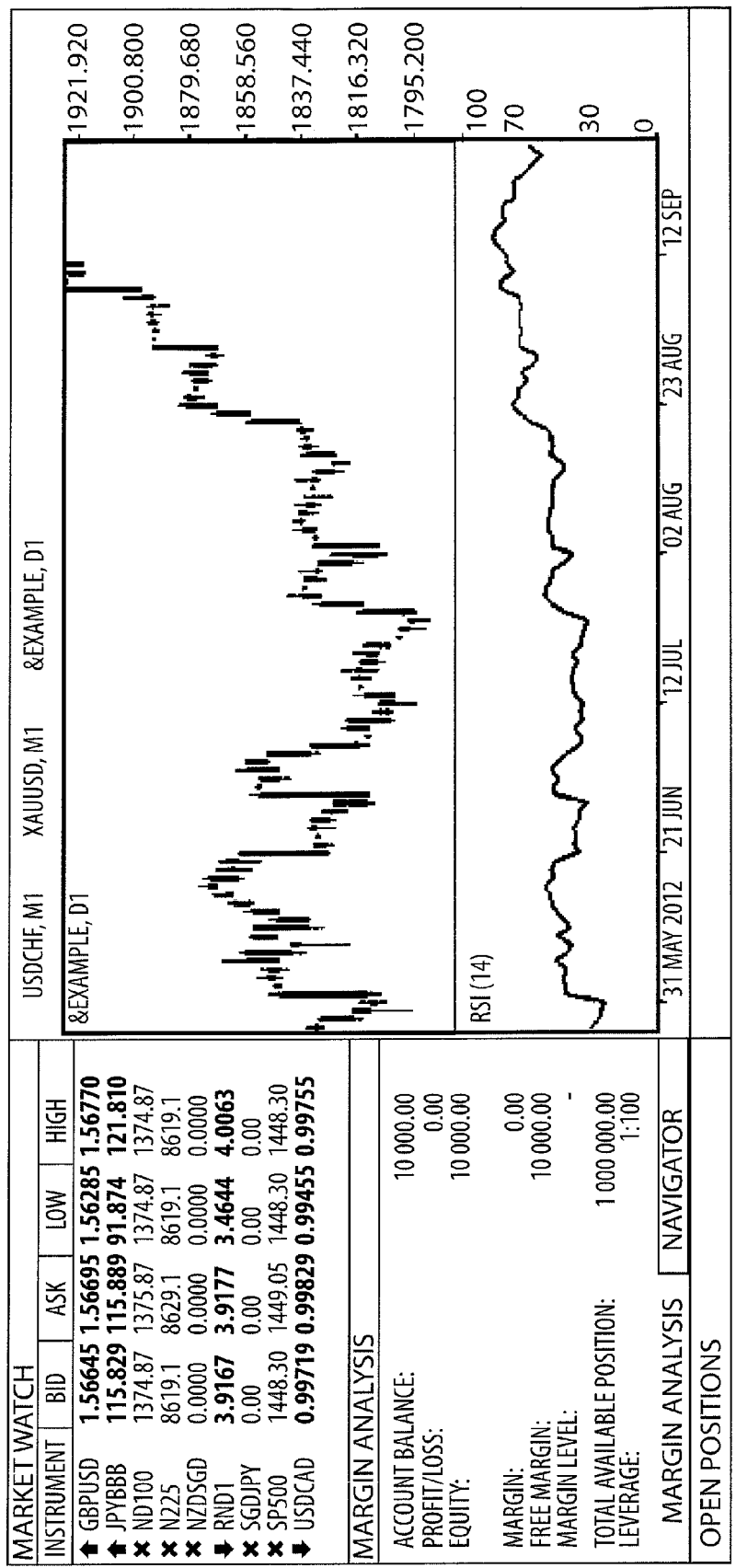
FIG. 13 illustrates an example of a technical analysis tool-generated "RSI" (relative strength index) to facilitate technical analysis of the composite instrument, according to an aspect of the present disclosure.
Figure 14:
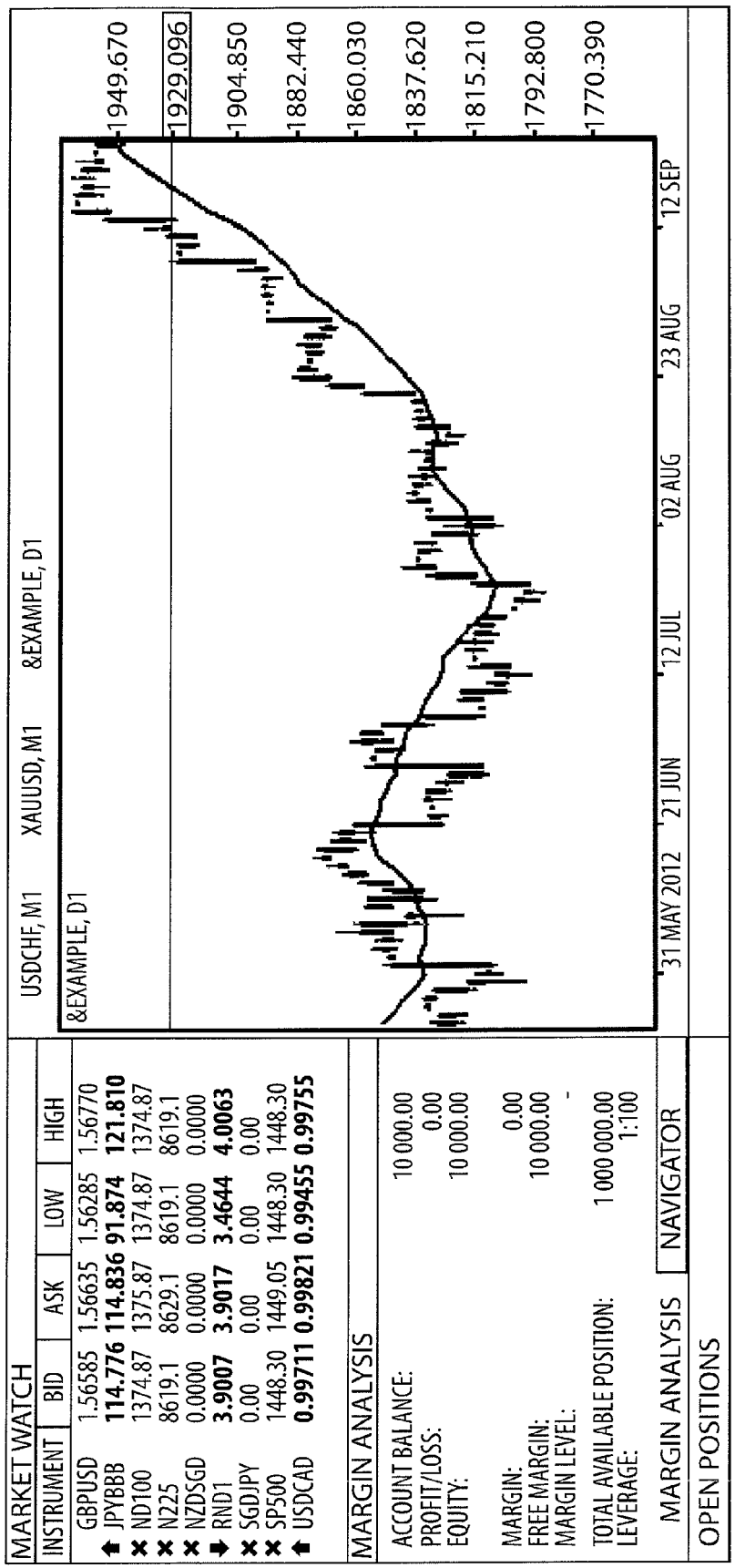
FIG. 14 illustrates an example of a technical analysis tool-generated "SMA" (simple moving average) to facilitate technical analysis of the composite instrument, according to an aspect of the present disclosure.
Figure 15:
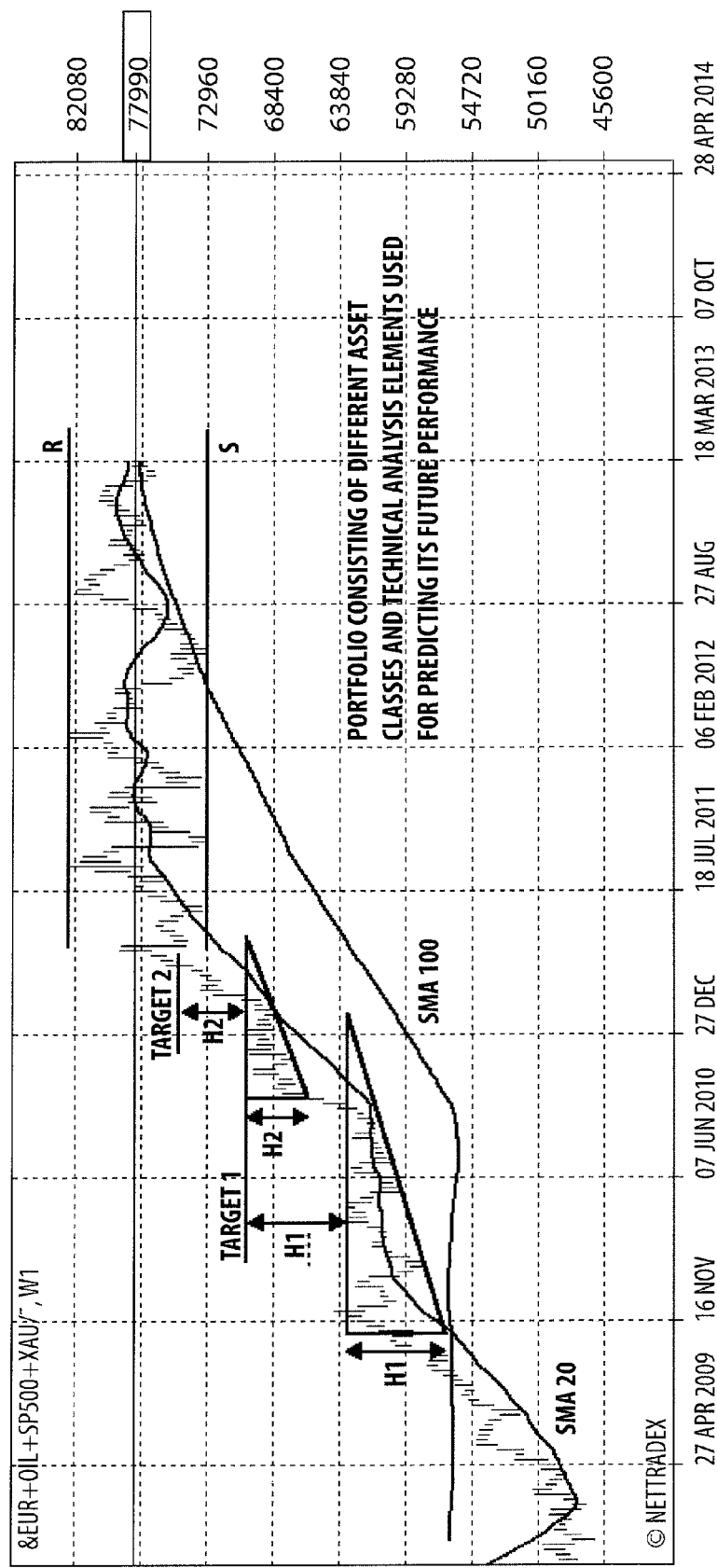
FIG. 15 illustrates an example of a chart illustrating a graphed composite instrument with moving average, price support and price resistance levels, and triangle chart patterns drawn to facilitate technical analysis, according to an aspect of the present disclosure.
Figure 16:
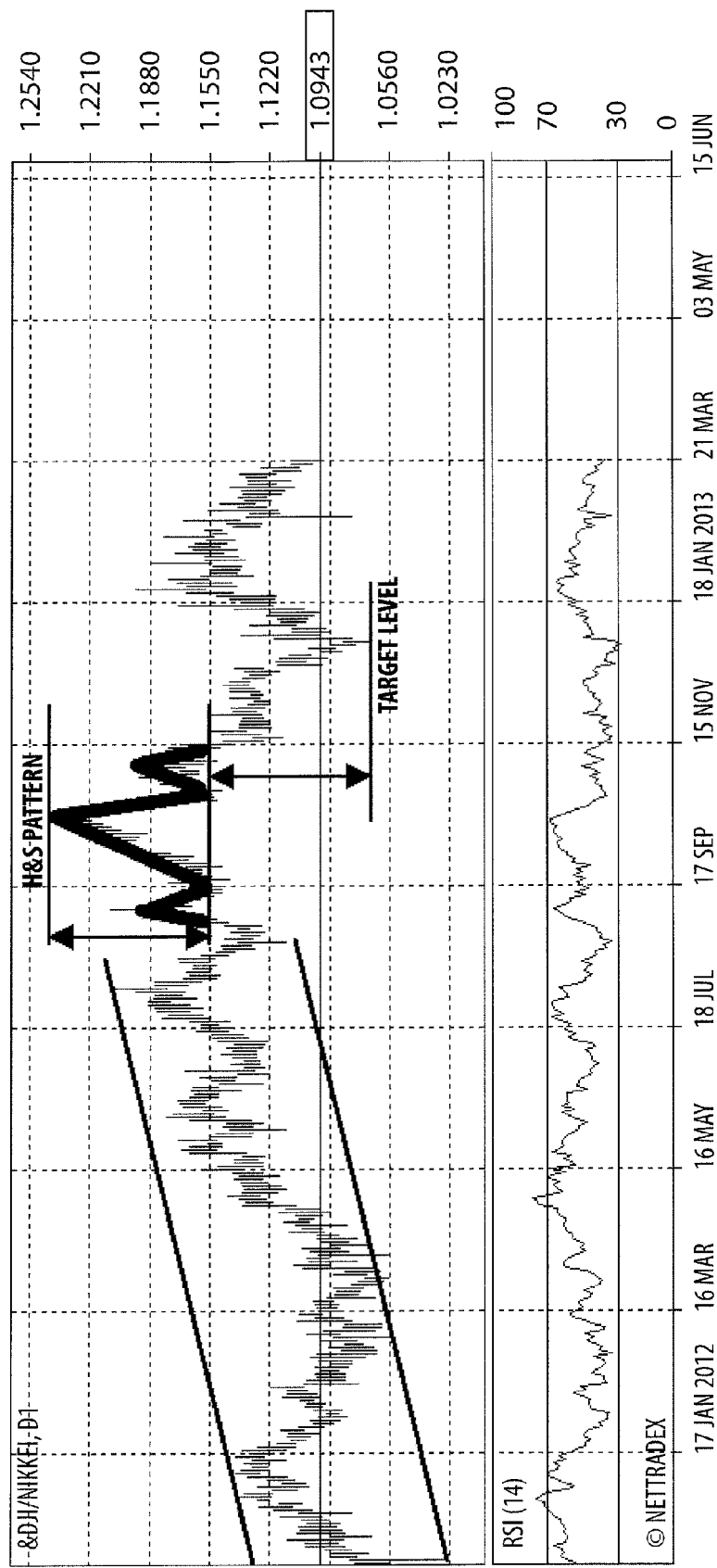
FIG. 16 illustrates an example of a chart illustrating a graphed composite portfolio showing the price channel, RSI indicator, and a head and shoulders chart pattern.
Figure 17:
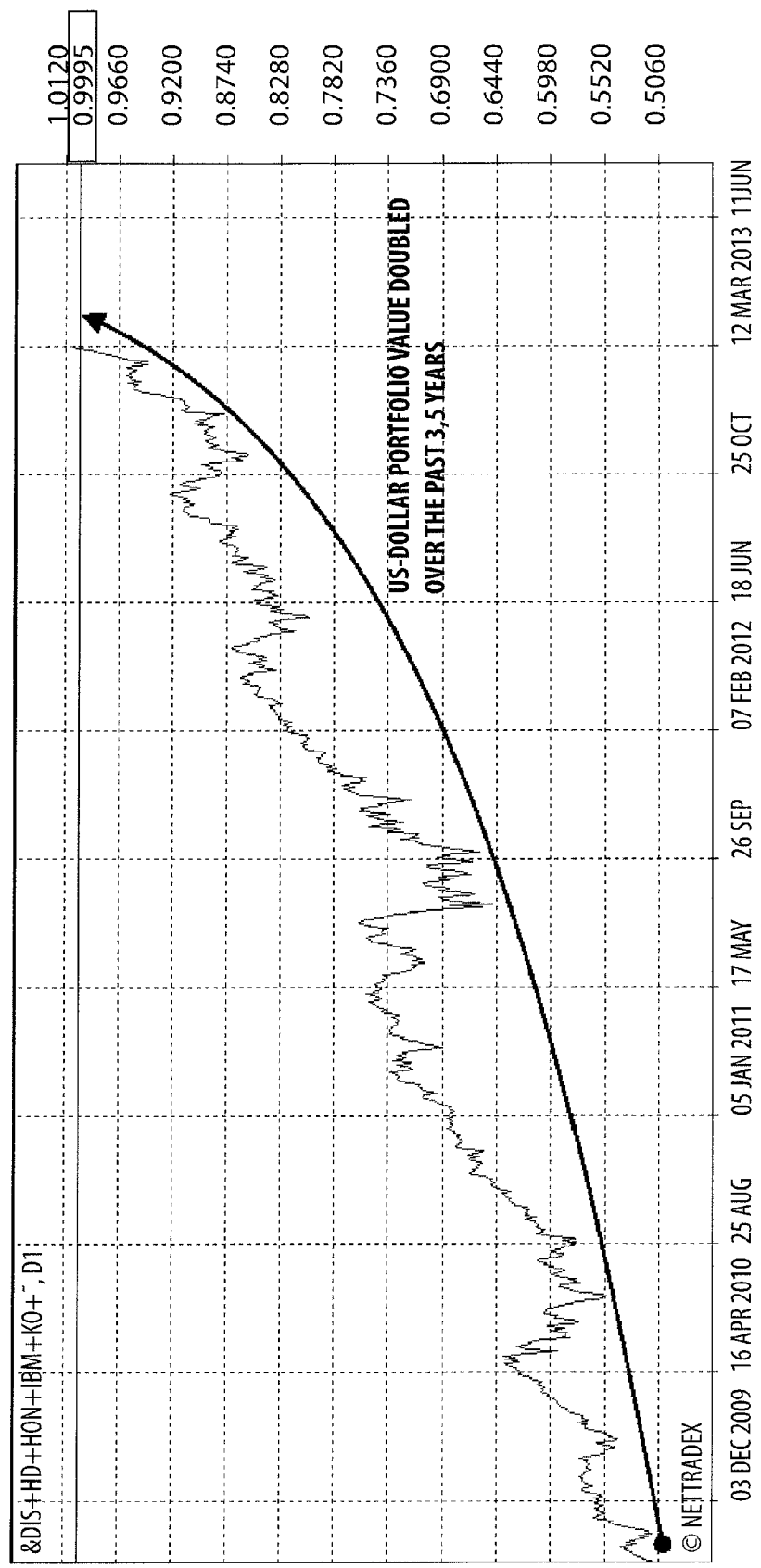
FIG. 17 is an example of a chart illustrating a portfolio including U.S. stocks Disney (DIS) at 20% of portfolio, Home Depot (HD) at 20% of portfolio, Honeywell (HON) at 15% of portfolio, International Business Machine (IBM) at 15% of portfolio, Coca-Cola (KO) at 10% of portfolio, and McDonalds (MCD), with current portfolio value of $100,000 weighted against $100,000 USD to yield the PCI value close to 1.
Figure 18:
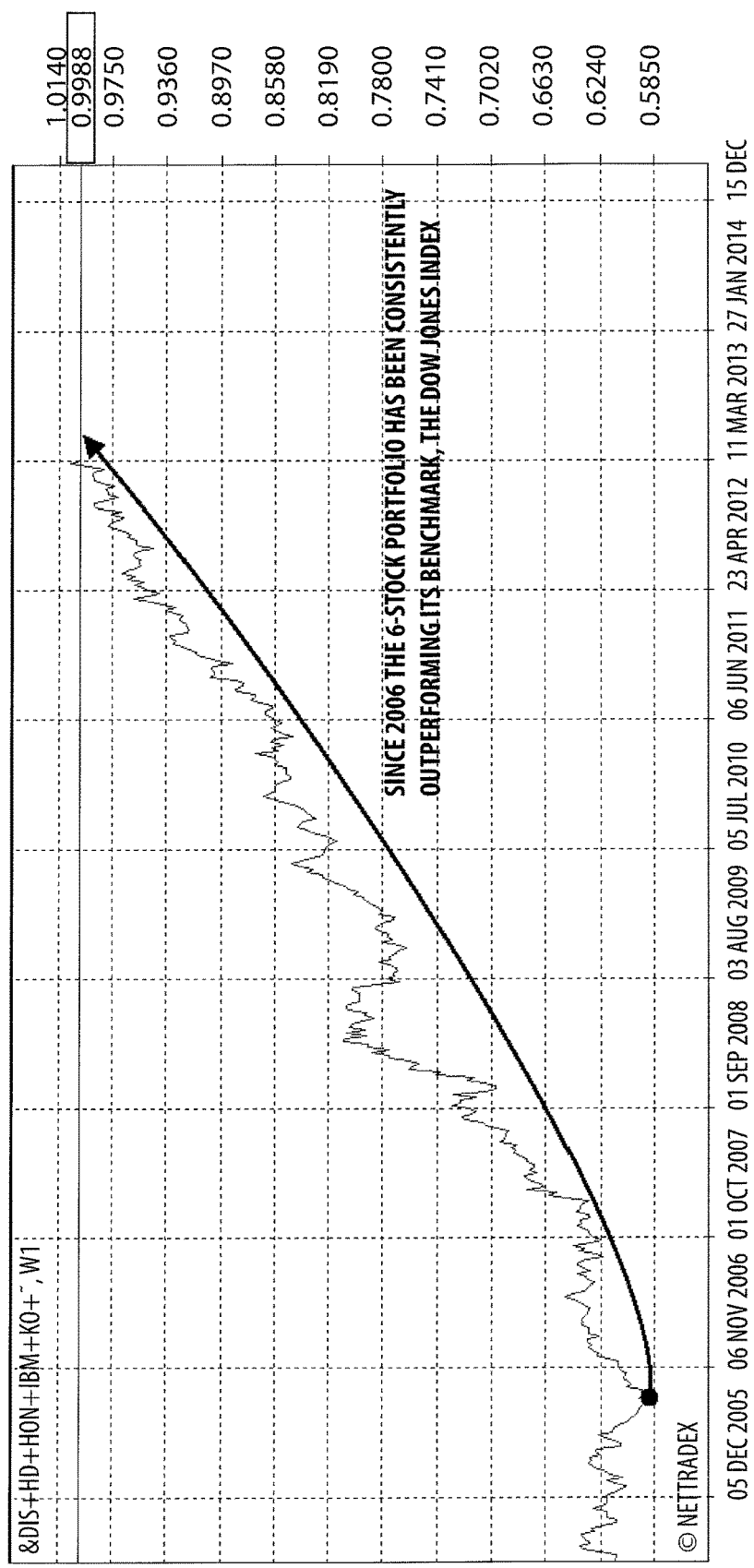
FIG. 18 is an example of a chart illustrating a portfolio including U.S. stocks Disney (DIS) at 20% of portfolio, Home Depot (HD) at 20% of portfolio, Honeywell (HON) at 15% of portfolio, International Business Machine (IBM) at 15% of portfolio, Coca-Cola (KO) at 10% of portfolio, and McDonalds (MCD), with portfolio value of $100,000 weighted against a portfolio of 100,000 USD invested in benchmark Dow Jones Index.

FIG. 8 illustrates that the user has selected and the system has drawn another technical analysis graphing tool called a "Fibonacci fan" to aid in the visualization and analysis of the composite instrument trend, and the scale of the movements of the composite instrument over time. Further analysis tools and technical indicators, including the "Fibonacci extension", the "double bottom" chart pattern, the "alligator indicator", the MACD (moving average convergence/divergence), the RSI (relative strength index), the SMA (simple moving average), the moving average, the price support and price resistance levels and triangle chart patterns drawn, and the price channel RSI indicator, and head and shoulders chart pattern are illustrated in FIGS. 9-16. The time scale shown by the x axis and the time period graphed may also be varied by the user. Other types of market item analysis tools and visualization aids may also be used. For example, the user may wish to run the composite instrument backward, by showing the value of the composite instrument over a period of time before the composite instrument was created. The trader may wish to obtain the price of hypothetical trades of one or more assets of the composite instrument, or of one of the other or the portfolios of the composite instrument or of the composite instrument, as a whole, at various times or over a period of time, and these services may also be provided by the system.

In addition, the user may wish to receive a user alert when the value of the composite instrument reaches a certain target value, for example, a particular high or a low. For example, the user may specify that if the composite instrument reaches a 52 week high or low, or a day high or low, or the like, or if the composite instrument reaches a numerical target or percentage change set by the trader, then the user wishes to receive a user alert, such as an alert on the graphic user interface, an e-mail, SMS or other type of text message, voicemail or the like indicating this event. This is shown in S12 where the user enters in the alert request and specifies the target or the range for the composite instrument value, and S13 illustrates that the system is generating and providing the alert to the user as specified. Composite instrument tracker 75 may keep track of such composite instrument target values or ranges specified as part of the alert requests, and can then provide instructions to controller 79 to generate and to provide the user alert.

The user may also wish to specify that the user alert to be received include one or more assets that comprise the composite instrument, and/or those asset values, or may wish to specify that the user alert contain one of the first or second portfolios of the composite instrument or that portfolio's value. In this way, the user can think of the composite instrument as an indicator, which when reaching a numerical target, will indicate that a particular asset or set of assets of the composite instrument should be traded. Conversely, user alert may be set such that the value of the composite instrument is communicated when one or more assets of one of the portfolios or when the value of an entire portfolio of one of the two portfolios reaches a target designated by the user.

Also provided is a trade ordering step at S14 to enable the trader to request a trade of one or more assets of the composite instrument, or of all the assets of the composite instruments. For example, at S14 the user may wish to instruct that a trade should be executed for the first asset of the first portfolio or of all the assets of the first portfolio in real time, or the user may wish to order that such a trade be automatically executed by the system, or requested to a trading platform by the system, when the composite instrument reaches a target value. For example, if the composite instrument reaches a 52 week high or low, or a day high or low, or a particular target value input by the trader, or the like, then at the time he wishes to have the trade executed. The order may be set for one or more asset of the composite instrument or an entire portfolio of the composite instrument, and may be set to be executed when the composite instrument reaches a target set by the user in advance.

At S15 the system connects to a trading platform, such as to a trading platform provided by a commercial clearing house or an exchange or the like to execute the trade specified by the user request at S14. The order for the trade is placed at S16, and at S17 the user is provided a confirmation of the trade. Accordingly, the user's account is updated at S18 and a detailed report can then be additionally provided to the user. For example, a third party payment platform can be accessed to enable payment by the user at the time the order is executed or before the order is executed, for example, the user may wish to have an account balance on the system with which to trade. User account module 72 can keep track of the account balance of the user maintained at the system or can connect with a third party payment platform such as a credit card company, PayPal or the like or with a bank to receive and to wire funds or electronic fund transfers to the user's account at the system.

In addition, the user can share the composite instrument that he creates with other users. For example, the user can send or receive composite instrument asset and quantity information or composite instrument value information, or a graph of the composite instrument or a name that is given to the composite instrument to other users. For example, a second user remote from the first user also using the system can be sent the composite instrument created by the first user, including the name of the composite instrument and the assets that comprise the first and second portfolios of the composite instrument and their respective quantities.

Figure 22:
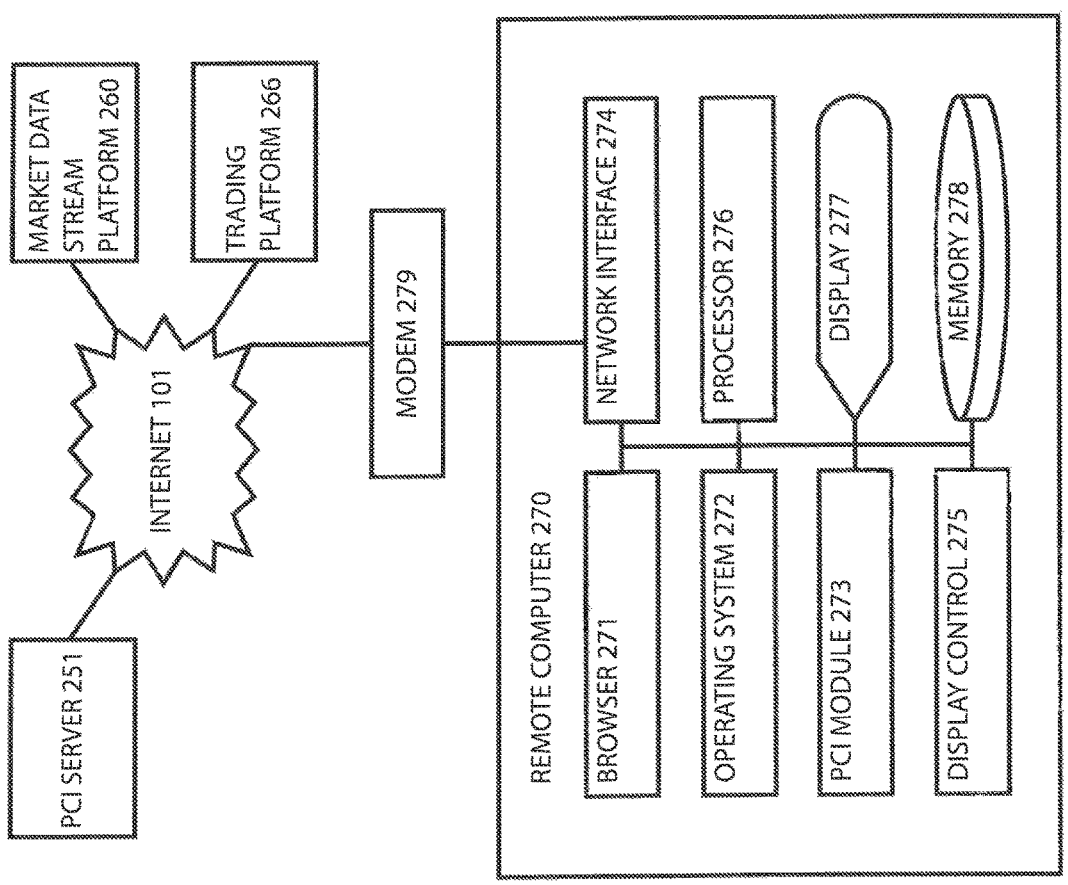
FIG. 22 illustrates an example of the composite instrument module on a remote computer connected via a network to a composite instrument server, according to an aspect of the disclosure.

An example of a remote computer 270 interacting with a composite instrument server will now be described with reference to FIG. 22.

A user may wish to create, change, perform technical analysis on, share, trade, set alerts for, or otherwise use a composite instrument from a remote location, such as at a home or office computer, laptop, smartphone, handheld device or other portable device and connect with composite instrument server 251 through internet 101. For example, the user may wish to download the composite instrument module 273 residing on remote computer 270 from the composite instrument server 251 for a fee or as a monthly subscriber or subscriber based on a number of trades or the like, or the composite instrument module can be purchased and uploaded to the user's device. Composite instrument module 273 is described in this example as software, however it will be understood that composite instrument module 273 can be provided as hardware, firmware, a card or the like, or as a combination of the foregoing. In addition, composite instrument module 273 may be an app or applet downloaded in real time when accessing composite instrument server 251.

Remote computer 270 includes browser 271 that allows user to navigate to composite instrument server 251 over Internet 101 using network interface 274. Network interface 274 may be connected or may include modem 279, a wireless router or the like or other equipment to provide wired or wireless network access known in the art. Using composite instrument module 273, a user may create a composite instrument or may access or change a composite instrument previously created. The composite instrument may be stored by composite instrument module 273 in local memory 278 of remote computer 270, or in the alternative, or in addition to such storage, the composite instrument created by the user may be stored by composite instrument server 251 at a premises affiliated with composite instrument server or may be stored in the cloud.

Market data stream provided by market data stream platform 260 can also be connected to internet 101 to provide real time market data for the assets of the first and second portfolio of the composite instrument created by or accessed by a user using composite instrument module 273. For example, market data stream may be provided by market data stream platform 260 directly to remote computer 270 and composite instrument module 273 may include an asset processor to generate values for the first and second portfolios based on the current trading prices of the underlying assets. Or, the market data stream may be available only for composite instrument server, such that composite instrument module 273 may request composite instrument server 251 to return the value of the composite instrument generated according to the asset prices, or to return the asset prices, to remote computer 270.

Operating system 272 will then be requested by composite instrument module 273 to instruct display control 275 to control display 277 to display or graph the composite instrument generated. In addition, user can then use technical analytics tools on the graphed composite instrument, as earlier described. For example, composite instrument module 273 may host a suite of such technical analytics tools, or composite instrument module 273 may request composite instrument server 251 to process the data and to provide instructions for generating the graph of the technical analysis tool output.

Also contemplated is a system that communicates with trading platform 266 via Internet 101 for placing trades or executing trades ordered by user. Thus, as discussed, the user may wish to order a trade based on a performance of a composite instrument that he has created, or may wish to place an order, such as a market order, a limit order, a day order, or the like for trading one asset or more than one asset of a portfolio, or one asset or more than one asset of a second portfolio, or all assets of both portfolios of the composite instrument, based on the performance of the composite instrument. For example, when the composite instrument reaches a high or low target set by the user, then such an order will be executed by composite instrument module 273 sending instructions to network interface 274 to generate a signal to be sent to a trading platform 266 via modem 279 and Internet 101.

In addition, or in the alternative, the trading signal can be sent to composite instrument server 251, which then connects with trading platform 266 via Internet 101. Thus, communication can be achieved directly between computer 270 and trading platform 266 via internet 101 and modem 279, or may be achieved via composite instrument server 251, which then instructs trading platform 266 to execute the trade. Trading platform 266 may be thought of as a computer platform provided by an exchange, such as a stock market, commodities market, bond market, spot market, foreign currencies exchange, or the like, or may be a trading platform provided by a third party which then, for example, instructs a trade at an exchange. While shown as modem 279, it will be understood that modem 279 can also include or be coupled with a wireless router, hotspot, ISDN interface, wireless gateway, or other network device for connecting remote computer 270 with internet 101. Modem 279 can connect to remote computer 270 via a wired connection, such as using Ethernet cable or USB cable, fiber optic cable, coaxial cable, T1 line, or the like, or may be a wireless connection, such as a Bluetooth or a WiFi connection.

Such a composite portfolio trading method, sometimes referred to herein as GeWorko, can open up a new area for fundamental and technical analysis for traders, providing a fresh look on interrelations and correlations between various trading assets and instruments, including trading instruments that can be quite distinct from one another. Constructing combinations of assets, the trader therefore may thus exercise creative control of his own financial product, a personal composite instrument reflecting his individual needs and requirements and investment limitations. As the number of different combinations of assets is theoretically nearly unlimited, the trader has the ability to construct a virtually unlimited number of independent instruments, thus opening more space for the trader's imagination. The computer-based realization allows quickly transferring a trading idea to the analytical-trading platform, estimating its effectiveness and employing mutual analysis tools for forecasting.

Further, the method can be an entertaining and informative instrument for portfolio construction. The instrument can allow a user simultaneously open and close position or simulating the same, on a great number of instruments combined under a common, single trading idea. As there are two sets of assets in the composite portfolio GeWorko method allows considering both long and short positions when trading composite instruments.

The GeWorko method allows, for example, constructing stock portfolios, global stock indices, currency indices, globally diversified portfolios, indices of precious metals, sector or industry indices and much more. The user may chart his instrument in any currency. Further the method allows viewing any portfolio, index or a composition of assets relative to another portfolio, index or a composition of assets. The method therefore can be treated as a universal converter which allows expressing the value of one set of assets relative to another set of assets.

In this way, a number of types of traders can user the GeWorko method with advantage: traders holding investment portfolios expressed as composite instrument can optimize their trading portfolio composition and structure and rebalance portfolios as needed, can analyze composite price history, can apply technical analysis tools to determine optimal entrance and exit points for buying and selling portfolios, and assets of portfolios. In addition, traders who are devotees of cross or spread trading on similar instruments can use the method with advantage, studying evolutions of any possible relation between assets in time.

The GeWorko method provides not only new multiple trading opportunities, but also may be used to construct composite instruments which will serve as economic indicators, needed to analyze markets, sectors, economies, revealing hidden interrelations between assets or reflecting times of anomalous behavior of financial assets.

A composite instrument already created may be easily edited by the user. The user can change composition of the first or the second portfolio and/or change individual weights/quantities of assets in the first or the second portfolio. For example this function simplifies considerably portfolio optimization and rebalancing. After editing the user may replace already created composite instrument with the new one or save the new one under another name so both composite instruments will be available. This simplifies comparison of investment alternatives and therefore may lead to a more efficient portfolio management process.

The user may also review properties of a composite instrument. FIG. 23 illustrates properties of the instrument that is being created. Trade operations panel illustrated near the top in FIG. 23 illustrates the trade operations that can be performed to replicate a purchase of one unit of the composite instrument. Using notation that would be familiar to traders of foreign currency, the trade operations are for the base portfolio, buy 1000.00 AUDUSD, sell 486.20 USDCAD, and buy 3000.00 NZDUSD. For the quotation portfolio, the operations include buy 2,446.62 USDCHF, sell 303.40 EURUSD, and sell 606.80 GBPUSD. The number "2446.62" in front of USDCHF means that 2446.62 USD are bought and some quantity of CHF is sold. This quantity does not equal to 1500 CHF indicated by the user in the table entitled "Quotation" in the "Trade Operations" panel shown in FIG. 23. It equals approximately 2275.50 CHF (1500*1.5170, or volume set by the user for CHF, multiplied by the current PCI price). As will be apparent, the remaining two operations in the Quotation also have the multiple of 1.5170. This is done to make both parts of equation (base and quoted portfolios) equal in value. This is based on a principle used in currency trading: if we buy 1000 EURUSD at current rate of 1.3000, we actually buy 1000 EUR and sell 1300 USD (the purchasing power of 1000 EUR and of 1300 USD are equal at the moment of transaction).

It will be understood by a person of ordinary skill in the art that, in keeping with the convention prevalent in foreign exchange trading, the second operation in the base portfolio is written as "USDCAD" (as opposed to CADUSD), and therefore this operation is indicated as a sell operation, even though its in the base portfolio. Similarly for the USDCHF operation in the quotation portfolio, trades are traditionally noted in this way. As will be understood, each operation involves (simultaneously or near simultaneously) a buying and a selling transaction: buying or selling a first currency, that is the base currency, and selling (if the base currency was bought) or buying (if the base currency was sold) a quotation currency.

If the user wants to buy a unit of the PCI after it has been saved and is ready for trading, the system will open with positions showing the same currency pairs but with updated volumes according to the most recent currency exchange rate received. While the assets are illustrated using currency examples, it will be understood that any type of asset can be used and will be displayed similarly.

The trader can also sell the PCI, that is, using a single click or other operation performed on the interface, user can short the instrument. If the PCI is sold, then all "buy" orders on the list become "sell" orders, and all "sell" orders become "buy" orders. Similarly, if twenty (of some other multiple) units of the PCI are bought, then all quantities shown are multiplied by twenty (or by the multiple).

The bottom panel denoted "Instrument Browser" of FIG. 23 illustrates recent changes since the creation of the instrument for the assets of the currency, as updated automatically by information received, for example, from a market information feed.

The window of properties shows %-change of the composite instrument value since creation, %-changes of values of the first and the second portfolios of assets since creation of the PCI and %-changes of values of individual assets in the first and the second portfolios.

A thousand or more financial instruments or assets can be combined into one or both of the portfolios of the composite instrument under the GeWorko method, so the user may create instruments of varying complexity (from the most simple, involving only two assets, to really complex combinations).

Figure 19:
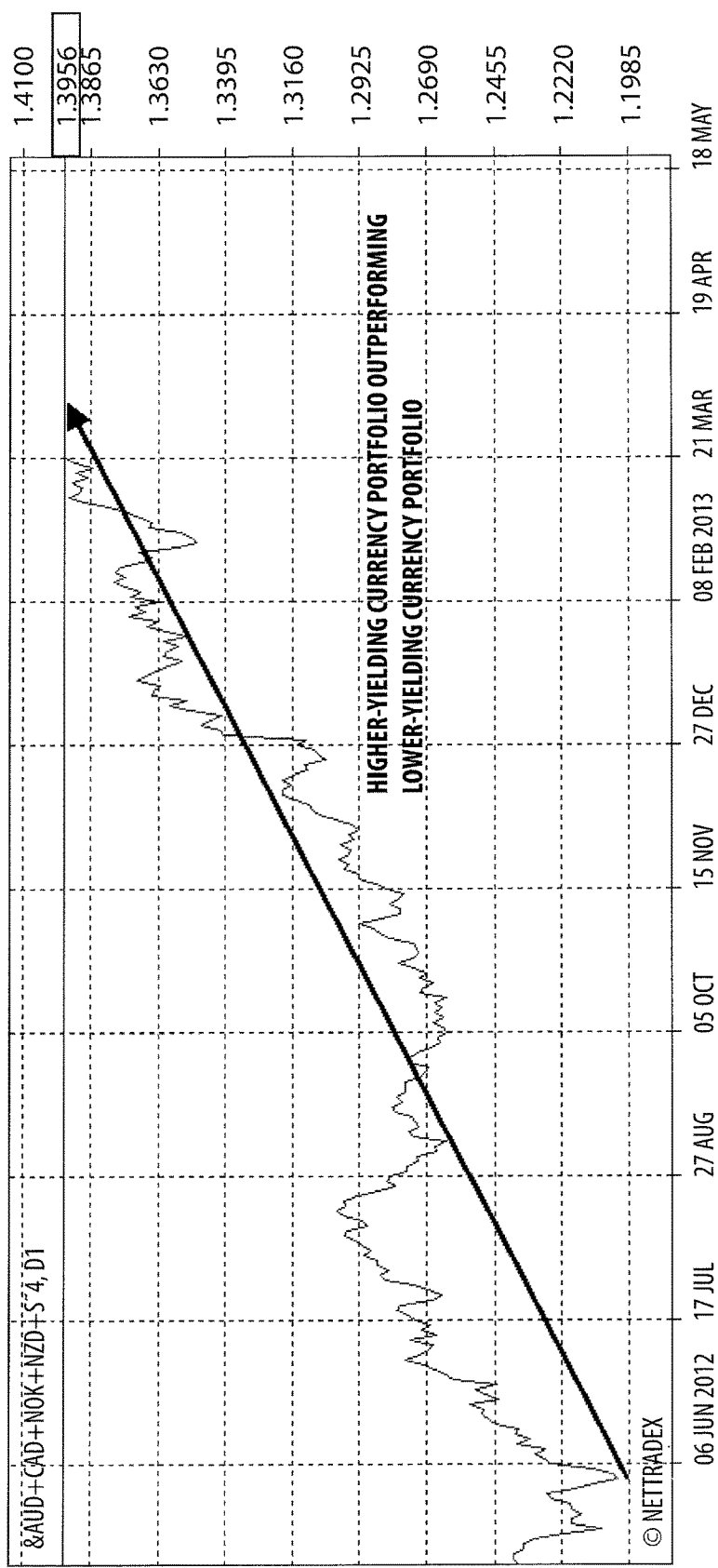
FIG. 19 illustrates an example of a chart graphing a composite instrument composed of a first portfolio comprising 1,000 AUD, 1,000 NZD, 1,000 NOK, 1,000 SEK and 1,000 CAD constructed against a second portfolio of lower-yielding currencies, the second portfolio including 1,000 CHF, 100,000 JPY and 1,000 DKK, according to an aspect of the present disclosure.
Figure 20:
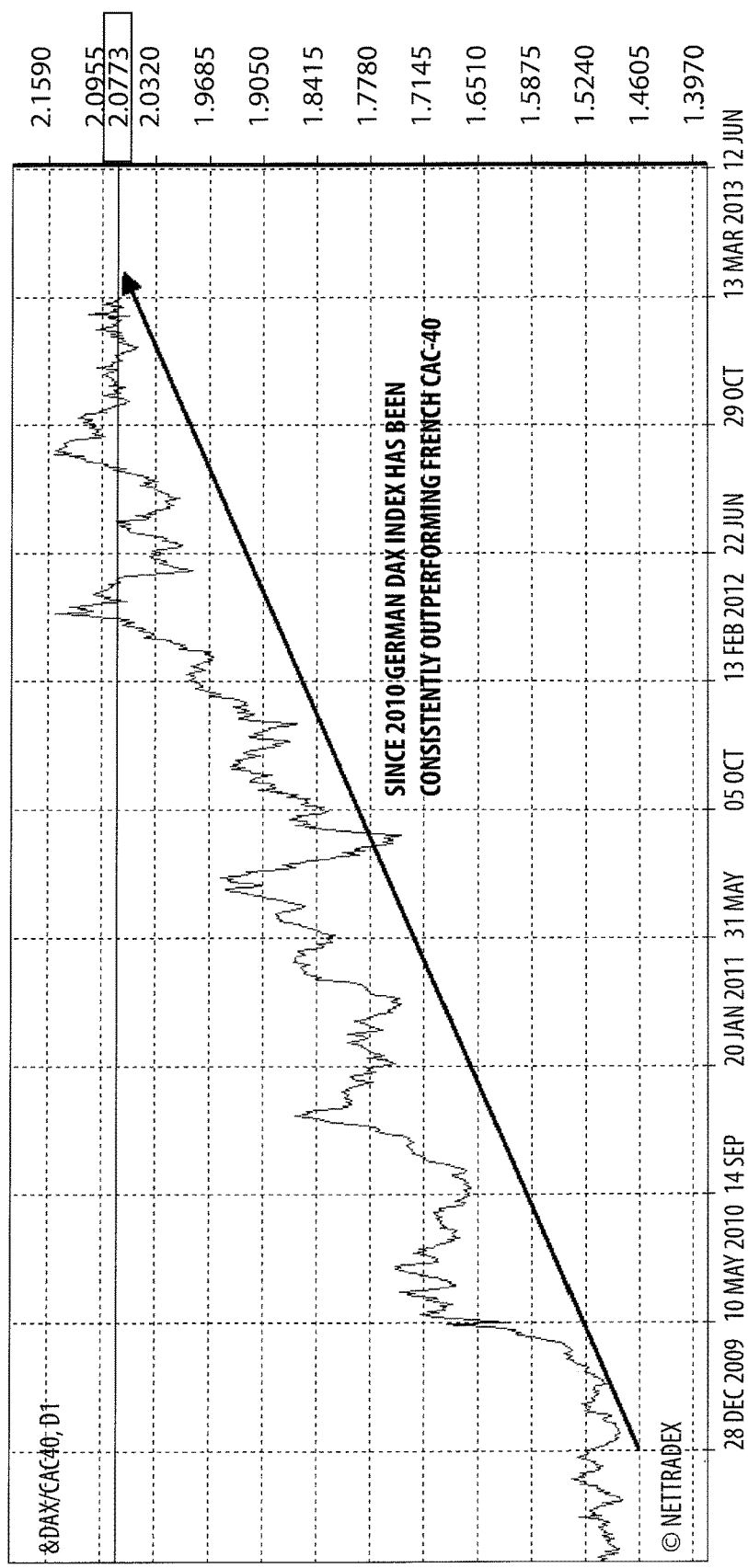
FIG. 20 illustrates an example of a chart showing the performance of the German DAX index compared with the French CAC 40.

Pooling together different asset classes may lead to diversification benefits, and the GeWorko method provides for a convenient and an effective visualization and forecasting tool. For example, suppose a trader is interested in analyzing the performance of a basket of currencies pooled together under a common idea. That is, the user may wish to compare the performance and dynamics of a first currency portfolio with higher yielding currencies against a second portfolio of lower yielding currencies or "safe havens" over a previous time to gauge global economic outlook for the foreseeable future and follow switches well-known among investors and traders, that is switching from "risk-on mode" to "risk-off mode" and vice versa. FIG. 19 illustrates a composite instrument composed of 1,000 AUD, 1,000 NZD, 1,000 NOK, 1,000 SEK and 1,000 CAD, which the trader thinks of as higher-yielding or riskier currencies, comprising the first portfolio, and a second portfolio comprising 1,000 CHF, 100,000 JPY, and 1,000 DKK, which the trader regards as "safe havens." Such a composite instrument reveals for the trader that compared to the 2007 recession years, over the period June 2012-March 2013, the higher-yielding currencies outperform the safe havens, which could signal a more bullish global economic outlook. It could also signal trading opportunities on foreign currency exchanges as well as on other markets.

The present methods, functions, systems, computer-readable medium product, or the like may be implemented using hardware, software, firmware or a combination of the foregoing, and may be implemented in one or more computer systems or other processing systems, such that no human operation may be necessary. One or more software applications may be downloaded to a computer or portable device of the user to make possible the delivery of the graphical user interface to the user communicating remotely. The methods and functions can be performed entirely automatically through machine operations, but need not be entirely performed by machines. Similarly, the systems and computer-readable media may be implemented entirely automatically through machine operations but need not be so. A computer system may include one or more processors in one or more units for performing the system according to the present disclosure and these computers or processors may be located in a cloud or may be provided in a local enterprise setting or off premises at a third party contractor. Similarly, the information stored may be stored in a cloud or may be stored locally or remotely.

The computer system or systems that enable the viewer or user to interact with content or features can include a GUI (Graphical User Interface), or may include graphics, text and other types of information, and may interface with the user via desktop, laptop computer or via other types of processors, including handheld devices, telephones, mobile telephones, smartphones or other types of electronic communication devices and systems. A computer system for implementing the foregoing methods, functions, systems and computer-readable storage medium may include a memory, preferably a random access memory, and may include a secondary memory. Examples of a memory or a computer-readable storage medium product include a removable memory chip, such as an erasable programmable read-only memory (EPROM), a programmable read-only memory (PROM), removable storage unit or the like.

The communication interface may include a wired or wireless interface communicating over TCP/IP paradigm or other types of protocols, and may communicate via a wire, cable, fire optics, a telephone line, a cellular link, a satellite link, a radio frequency link, such as WI-FI or Bluetooth, a LAN, a WAN, VPN, the world wide web or other such communication channels and networks, or via a combination of the foregoing.

While the preferred embodiments of the invention have been illustrated and described, modifications and adaptations, and other combinations or arrangements of the structures and steps described come within the spirit and scope of the application and the claim scope.

What is claimed is:

1. A non-transitory computer-readable medium incorporating instructions configured, when executed by a computer, to receive user selection of a first portfolio of assets and user selection of a second portfolio of assets and to generate a user report of a personal composite instrument value, the instructions comprising:

user interface instructions configured to enable the user selection of the first portfolio of assets, by prompting user selection of:
a first asset of the first portfolio and a quantity of the first asset of the first portfolio,
a second asset of the first portfolio, and a quantity of the second asset of the first portfolio;

user interface instructions configured to enable the user selection of the second portfolio of assets, by enabling selection of:
a first asset of the second portfolio of assets and a quantity of the first asset of the second portfolio, and
a second asset of the second portfolio of assets and a quantity of the second asset of the second portfolio;
user interface instructions configured to enable receipt of a user trade instruction comprising a target value for the personal composite instrument, the user trade instruction instructing a trade of the assets represented by the personal composite instrument; and
asset price generating instructions configured automatically to receive from a market data stream a first trading price of the first asset of the first portfolio, a first trading price of the second asset of the first portfolio, a first trading price of the first asset of the second portfolio, and a first trading price of the second asset of the second portfolio;
portfolio processing instructions configured to cause the computer automatically to calculate a first value of the first portfolio according to the first trading price of the first asset of the first portfolio and the quantity of the first asset of the first portfolio, and according to the first trading price of the second asset of the first portfolio and the quantity of the second asset of the first portfolio, and to calculate a first value of the second portfolio according to the first trading price of the first asset of the second portfolio and the quantity of the first asset of the second portfolio, and according to the first trading price of the second asset of the second portfolio and the quantity of the second asset of the second portfolio;
personal composite instrument calculating instructions configured to cause the processor automatically to calculate a first value of the personal composite instrument by dividing the first value of the first portfolio by the first value of the second portfolio;
tick tracker instructions configured to generate a user report of a changed value of the personal composite instrument by tracking in real time, based on the market data stream, a value of the first asset and the value of the second asset of the first portfolio and calculating a changed value of the first portfolio accordingly, by tracking in real time, based on the market data stream, the value of the first asset and the value of the second asset of the second portfolio and calculating a changed value of the second portfolio accordingly, and by calculating and reporting the changed value of the personal composite instrument based on the changed value of the first portfolio and the changed value of the second portfolio; and
order generating instructions configured to determine automatically, based on the user trade instruction, whether the changed value of the personal composite instrument meets the target value, and when it is determined that the changed value of the personal composite instrument meets the target value, to automatically generate a trade order according to the user trade instruction and to communicate the trade order to a trading platform for executing the trade of the assets.

2. The computer-readable medium of claim 1, wherein the first asset of the first portfolio is a market item traded on a foreign currency exchange.

3. The computer-readable medium of claim 1, wherein the first asset of the second portfolio is a market item traded on a foreign currency exchange.

4. The computer-readable medium of claim 1, wherein the first asset of the first portfolio is a published market index.

5. The computer-readable medium of claim 1, wherein the first asset of the first portfolio is a market item traded on an equities market.

6. The computer-readable medium of claim 1, wherein the first asset of the second portfolio is a market item traded on an equities market.

7. The computer-readable medium of claim 1, wherein the first asset of the first portfolio is a market item traded on a commodities market.

8. The computer-readable medium of claim 1, wherein the first asset of the second portfolio is a market item traded on a commodities market.

9. The computer-readable medium of claim 1, wherein the first asset of the first portfolio is a market item traded on a derivatives market.

10. The computer-readable medium of claim 1, wherein the first asset of the second portfolio is a market item traded on a derivatives market.

11. The computer-readable medium of claim 1, wherein the first asset of the first portfolio is a market item traded on a fixed income market.

12. The computer-readable medium of claim 1, wherein the first asset of the second portfolio is a market item traded on a fixed income market.

13. The computer-readable medium of claim 1, further comprising graphical user interface instructions configured to generate a graph of values of the personal composite instrument over a time frame, wherein the time frame is selected according to user input.

14. The computer-readable medium of claim 13, wherein the time frame indicates values of the personal composite instrument for a period of time that occurred before the user created the personal composite instrument.

15. The computer-readable medium of claim 13, wherein the graphical user interface provides graphics representing technical tool results drawn on the graph, wherein the technical tool is selected according to user input.

16. The computer-readable medium of claim 1, wherein the instructions further comprise:
instructions to report confirmation of the trade to the user.

17. The computer-readable medium of claim 1, wherein the instructions further comprise:
user interface instructions configured to enable receipt of a user instruction to trade all of the assets represented by the personal composite instrument, in response to one instruction received from the user; and
order generating instructions configured to generate a trade order according to the user instruction to trade.

18. The computer-readable medium of claim 17, wherein the trade order is one of a market order, a pending order, a day order, a limit order, a stop order, an activation order, or any combination of the foregoing orders.

19. The computer-readable medium of claim 1, further comprising instructions to enable a user to share the personal composite instrument created with a second user.

20. The computer-readable medium of claim 1, wherein the instructions further comprise:
instructions to enable a user to input an alert request specifying user selection of a target personal composite instrument value; and
instructions to generate and to provide a user alert when the target personal composite instrument value is reached.

21. The computer-readable medium of claim 1, wherein the instructions further comprise:

instructions to enable a user to input an alert request specifying user selection of a target personal composite instrument value and an asset of interest, the asset of interest being an asset of the first portfolio or the second portfolio; and instructions to generate and to provide a user alert when the target personal composite instrument value is reached, wherein the user alert indicates the asset of interest and a current price of the asset of interest.

22. The computer-readable medium of claim 1, wherein the instructions further comprise first trade ordering instructions configured to enable a user to order in a single step a buy operation of the personal composite instrument, in response to which assets of the first portfolio are automatically bought and assets of the second portfolio are automatically sold.

23. The computer-readable medium of claim 1, wherein the instructions further comprise second trade ordering instructions configured to enable the user to order a sell operation of the personal composite instrument, in response to which assets of the first portfolio are automatically sold and assets of the second portfolio are automatically bought.

24. The computer-readable medium of claim 1, wherein the asset price generating instructions are configured to receive from a real-time market data stream the first trading price of the first asset of the first portfolio, the first trading price of the second asset of the first portfolio, the first trading price of the first asset of the second portfolio, and the first trading price of the second asset of the second portfolio.

25. The computer-readable medium of claim 1, wherein the instructions further comprise:
edit instructions configured to receive editing commands input by a user and to edit the personal composite instrument by changing a composition of the first portfolio of assets; and
edit instructions configured to receive editing commands input by a user and to edit the personal composite instrument by changing composition of the second portfolio of assets.

26. The computer-readable medium of claim 1, wherein the instructions further comprise:
edit instructions configured to receive editing commands input by a user and to edit the personal composite instrument by changing weights of assets of the first portfolio of assets; and
edit instructions configured to receive editing commands input by a user and to edit the personal composite instrument by changing weights of assets of the second portfolio of assets.

27. A system comprising a computer-readable medium incorporating instructions configured, when executed by a computer to receive user selection of a first portfolio of assets and user selection of a second portfolio of assets and to generate a user report of a personal composite instrument value, the instructions comprising:
user interface instructions configured to enable the user selection of the first portfolio of assets, by prompting user selection of:
a first asset of the first portfolio and a quantity of the first asset of the first portfolio,
a second asset of the first portfolio, and a quantity of the second asset of the first portfolio;
user interface instructions configured to enable the user selection of the second portfolio of assets, by enabling selection of:
a first asset of the second portfolio of assets and a quantity of the first asset of the second portfolio, and
a second asset of the second portfolio of assets and a quantity of the second asset of the second portfolio;
user interface instructions configured to enable receipt of a user trade instruction comprising a target value for the personal composite instrument, the user trade instruction instructing a trade of the assets represented by the personal composite instrument; and
asset price generating instructions configured automatically to receive a first trading price of the first asset of the first portfolio, a first trading price of the second asset of the first portfolio, a first trading price of the first asset of the second portfolio, and a first trading price of the second asset of the second portfolio;
portfolio processing instructions configured to cause the computer automatically to calculate a first value of the first portfolio according to the first trading price of the first asset of the first portfolio and the quantity of the first asset of the first portfolio, and according to the first trading price of the second asset of the first portfolio and the quantity of the second asset of the first portfolio, and to calculate a first value of the second portfolio according to the first trading price of the first asset of the second portfolio and the quantity of the first asset of the second portfolio, and according to the first trading price of the second asset of the second portfolio and the quantity of the second asset of the second portfolio;
personal composite instrument calculating instructions configured to cause the processor automatically to calculate a first value of the personal composite instrument by dividing the first value of the first portfolio by the first value of the second portfolio;
tick tracker instructions configured to generate a user report of a changed value of the personal composite instrument by tracking in real time, based on the market data stream, a value of the first asset and the value of the second asset of the first portfolio and calculating a changed value of the first portfolio accordingly, by tracking in real time, based on the market data stream, the value of the first asset and the value of the second asset of the second portfolio and calculating a changed value of the second portfolio accordingly, and by calculating and reporting the changed value of the personal composite instrument based on the changed value of the first portfolio and the changed value of the second portfolio; and
order generating instructions configured to determine automatically, based on the user trade instruction, whether the changed value of the personal composite instrument meets the target value, and when it is determined that the changed value of the personal composite instrument meets the target value, to automatically generate a trade order according to the user trade instruction and to communicate the trade order to a trading platform for executing the trade of the assets; and
the system further comprising:
a second computer remote from the computer, the second computer comprising:
a storage medium;
a network interface configured to provide electronic communication over a network with the computer; and
remote user instructions configured to be executed by the second computer, the remote user instructions comprising:

instructions to provide a graphical user interface on a computer display connected to the second computer and to enable user selection of the first portfolio of assets and the second portfolio of assets;

instructions to store on the storage medium the user selection of the first portfolio of assets and the second portfolio of assets; and instructions to communicate automatically the first value of the personal composite instrument to the computer via the network interface, and to report automatically to a user at the second computer the first value of the personal composite instrument.

28. The system of claim 27, wherein the remote user instructions further comprise:

user interface instructions configured to enable receipt of a user instruction to trade one or more of the assets of the personal composite instrument;

order generating instructions configured to generate a trade order according to the instruction to trade and to communicate the trade order to a trading platform; and instructions to report confirmation of the trade to the user.

29. A method of receiving by a computer user selection of a first portfolio of assets and user selection of a second portfolio of assets and generating a user report of a personal composite instrument value, the method comprising:

enabling the user selection of the first portfolio of assets and the second portfolio of assets, by prompting user selection of:

at least two assets of the first portfolio and a quantity for each asset of the first portfolio, at least two assets of the second portfolio of assets and a quantity of each asset of the second portfolio; and receiving a user trade instruction comprising a target value for the personal composite instrument, the user trade instruction instructing a trade the assets represented by the personal composite instrument;

automatically receiving in real time, by the computer, from a real-time market data stream, a respective trading price of each asset of the first portfolio, and a respective trading price of each asset of the second portfolio;

calculating, automatically by the computer, a first value of the first portfolio according to the respective trading price of each asset of the first portfolio and the quantity of each asset of the first portfolio, and calculating, by the computer, a first value of the second portfolio, according to the respective trading price of each asset of the second portfolio and the quantity of each asset of the second portfolio;

calculating, automatically by the computer, a first value of the personal composite instrument by dividing the first value of the first portfolio by the first value of the second portfolio;

generating a user report of a changed value of the personal composite instrument by tracking in real time, based on the market data stream, a respective value of the at least two assets of the first portfolio and calculating a changed value of the first portfolio accordingly, and by tracking in real time, based on the market data stream, a respective value of the at least two assets of the second portfolio and calculating a changed value of the second portfolio accordingly;

determining automatically, based on the user trade instruction, whether the changed value of the personal composite instrument meets the target value, and when it is determined that the changed value of the personal composite instrument meets the target value, generating a trade order according to the user trade instruction and communicating the trade order to a trading platform for executing the trade of the assets.

* * * * *